(12) United States Patent
Osamura et al.

(10) Patent No.: US 8,850,047 B2
(45) Date of Patent: Sep. 30, 2014

(54) ACCESS CONTROL METHOD, ACCESS CONTROL APPARATUS, AND ACCESS CONTROL PROGRAM

(71) Applicant: KAMOME Engineering, Inc., Tokyo (JP)

(72) Inventors: Kohji Osamura, Shinagawa-ku (JP); Takeshi Shiomura, Shinagawa-ku (JP)

(73) Assignee: KAMOME Engineering, Inc., Tokyo (JP)

( * ) Notice: Subject to any disclaimer, the term of this patent is extended or adjusted under 35 U.S.C. 154(b) by 0 days.

(21) Appl. No.: 13/873,322

(22) Filed: Apr. 30, 2013

(65) Prior Publication Data

US 2013/0238799 A1 Sep. 12, 2013

Related U.S. Application Data

(63) Continuation of application No. PCT/JP2011/074820, filed on Oct. 27, 2011.

(30) Foreign Application Priority Data

Nov. 1, 2010 (JP) ................................. 2010-245286

(51) Int. Cl.
*G06F 15/16* (2006.01)
*G06F 15/173* (2006.01)
*H04L 29/06* (2006.01)
*G06F 21/60* (2013.01)
*G06F 13/362* (2006.01)
*H04L 29/08* (2006.01)

(52) U.S. Cl.
CPC .......... *H04L 65/1083* (2013.01); *G06F 21/604* (2013.01); *G06F 13/362* (2013.01); *H04L 63/10* (2013.01); *H04L 67/142* (2013.01)
USPC ........................... 709/229; 709/223; 709/225

(58) Field of Classification Search
CPC ...... H04L 63/10; G06F 13/362; G06F 21/604
USPC ................................ 709/223, 225, 227, 229
See application file for complete search history.

(56) References Cited

U.S. PATENT DOCUMENTS 7,028,073 B1 * 4/2006 Bui et al. ....................... 709/203
8,089,986 B2 * 1/2012 Adamczyk et al. ........... 370/468
(Continued)

FOREIGN PATENT DOCUMENTS

JP     H07-13874 A    1/1995
JP     2003-50733 A    2/2003
(Continued)

*Primary Examiner* — Brian J Gillis
(74) *Attorney, Agent, or Firm* — Marvin A. Motsenbocker; MOTS Law, PLLC

(57) ABSTRACT

When an access control apparatus 1 receives an update request for session information of a user terminal 3, the access control apparatus having received the update request identifies multiple access control apparatuses storing therein the session information of the user terminal 3 on the basis of an identifier of the user terminal. Further, the access control apparatus 1 having received the update request sends a new update request for the session information of the user terminal 3 to each of the multiple identified access control apparatuses. Each of the access control apparatuses having received the new update request updates a session-data storage part of the access control apparatus having received the new update request in association with an update time.

10 Claims, 22 Drawing Sheets

(56) References Cited

U.S. PATENT DOCUMENTS

| | | |
|---|---|---|
| 8,204,996 B2 * | 6/2012 | Kim et al. ................... 709/227 |
| 2004/0213172 A1 * | 10/2004 | Myers et al. ................. 370/313 |
| 2004/0268358 A1 | 12/2004 | Darling et al. |
| 2005/0135343 A1 | 6/2005 | Karino et al. |
| 2007/0086433 A1 * | 4/2007 | Cunetto et al. ............... 370/352 |
| 2007/0121490 A1 | 5/2007 | Iwakawa et al. |
| 2008/0195738 A1 * | 8/2008 | Luo ............................ 709/227 |
| 2010/0061226 A1 | 3/2010 | Morishige et al. |
| 2011/0282846 A1 * | 11/2011 | Shepard et al. ............... 707/687 |
| 2014/0099925 A1 * | 4/2014 | Schell et al. ................. 455/411 |

FOREIGN PATENT DOCUMENTS

| | | |
|---|---|---|
| JP | 2005-25756 A | 1/2005 |
| JP | 2007-156569 A | 6/2007 |
| JP | 2010-063022 A | 3/2010 |
| WO | 03/007160 A1 | 1/2003 |
| WO | 2005/060187 A1 | 6/2005 |

* cited by examiner

FIG. 6

| USER TERMINAL ID | SESSION INFORMATION | UPDATE TIME | LAST ACCESS TIME | LOCATION INFORMATION | SERVICE USE HISTORY | ... |
|---|---|---|---|---|---|---|
| A | ... | ... | ... | ... | ... | ... |
| B | ... | ... | ... | ... | ... | ... |
| C | ... | ... | ... | ... | ... | ... |
| D | ... | ... | ... | ... | ... | ... |
| ... | | | | | | |

| USER TERMINAL ID | SERVICE ORDER | ----- |
|---|---|---|
| A | ----- | ----- |
| B | ----- | ----- |
| C | ----- | ----- |
| D | ----- | ----- |
| ----- | ----- | ----- |

| ACCESS CONTROL APPARATUS ID | UPDATE FLAG | REFERENCE FLAG |
|---|---|---|
| FIRST ACCESS CONTROL APPARATUS | AVAILABLE | AVAILABLE |
| SECOND ACCESS CONTROL APPARATUS | AVAILABLE | NOT AVAILABLE |
| THIRD ACCESS CONTROL APPARATUS | NOT AVAILABLE | NOT AVAILABLE |
| FOURTH ACCESS CONTROL APPARATUS | AVAILABLE | AVAILABLE |

23a

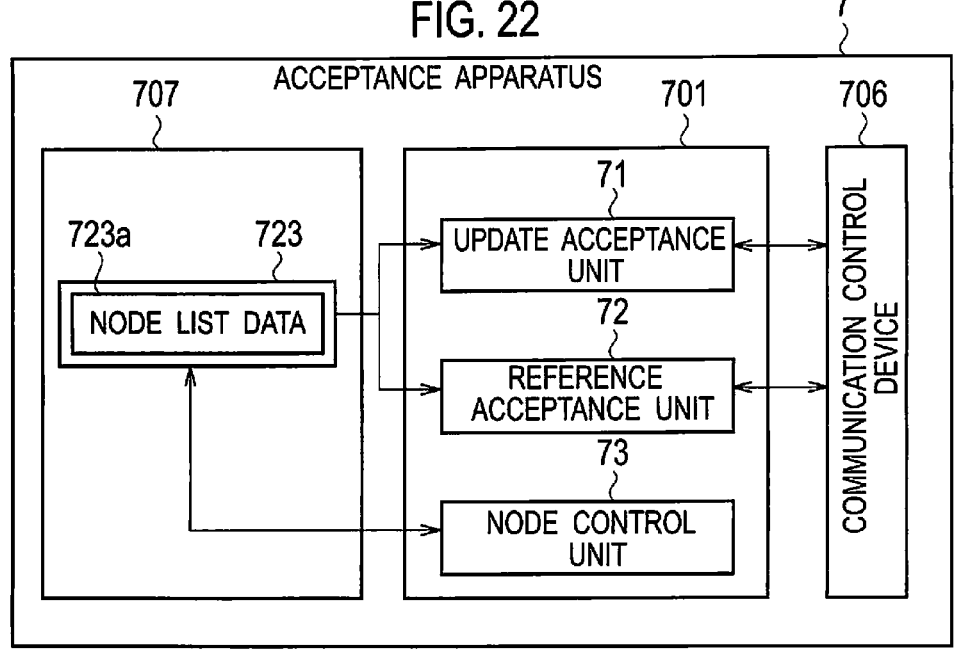
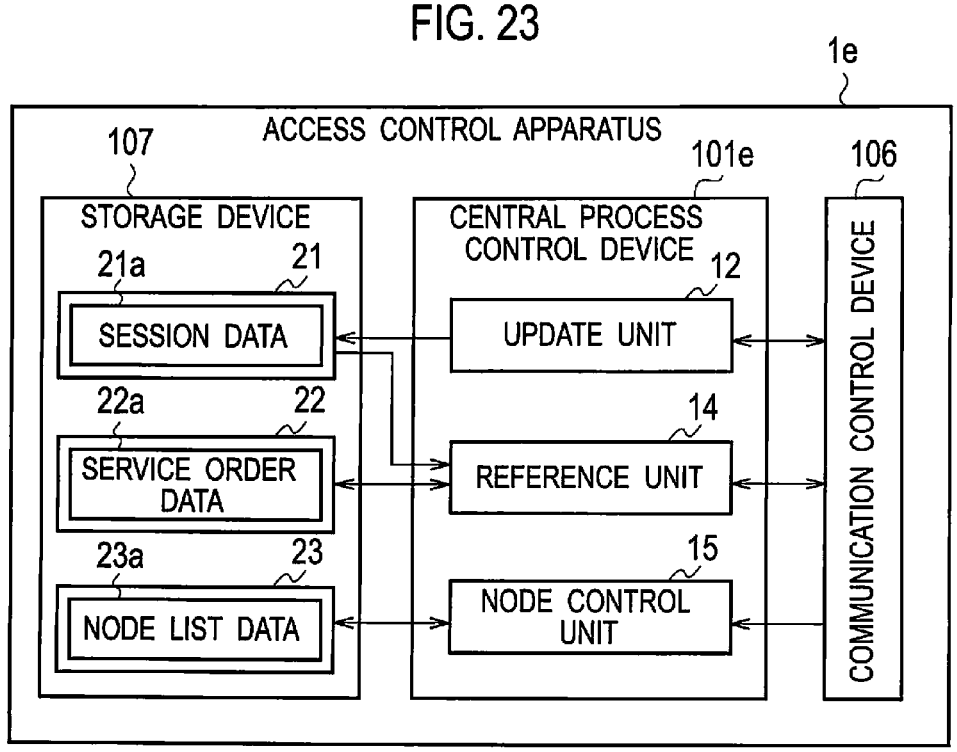

ACCESS CONTROL METHOD, ACCESS CONTROL APPARATUS, AND ACCESS CONTROL PROGRAM

CROSS-REFERENCE TO RELATED APPLICATIONS

This is a continuation Application of PCT International Application No. PCT/JP2011/074820 (filed Oct. 27, 2011), which in turn based upon and claims the benefit of priority from the Japanese patent Application No. 2010-245286 (filed Nov. 1, 2010); the entire contents of which are incorporated herein by reference.

TECHNICAL FIELD

The present invention relates to an access control method, an access control apparatus, and an access control program for use in an access control system including the access control apparatus which controls accesses of user terminals.

BACKGROUND ART

An access control system which accepts an access from a user terminal has been known. In a mobile phone communication network, this access control system accepts a connection request from a mobile phone, which is a user terminal, and permits a connection for the mobile phone. Moreover, when the mobile phone sends a service request to a service processing system, the access control system receives an inquiry regarding the status of the connection with the mobile phone from the service processing system. Further, the access control system sends the result to the service processing system.

Due to the development of information communication systems in recent years, there are increases in the number of user terminals, the number of connections in communication systems, and the number of service processing systems. Such increases have in turn increased processing loads on access control systems.

For example, for load balancing for access control, there is a communication method in which the packets in a series of communications are always routed to pass through the same path so that a TCP connection or a user session can be maintained (see Patent Document 1, for example). In this method described in Patent Document 1, each load balancer always distributes the packets in a series of communications to the same packet gateway, and the packet gateway distributes the packets in the series of communications to multiple service providing servers capable of executing the same service. In the communication method described in Patent Document 1, as described in page 11 in the description, a session management device manages the session of a series of packet exchanges started by an access of one mobile device to a network and ended at the end of necessary communications.

PRIOR ART DOCUMENT

Patent Document

PATENT DOCUMENT 1: International Patent Application Publication No. WO2003/007160

SUMMARY OF THE INVENTION

Problems to be Solved by the Invention

A usual access control system generally employs a method that causes a session management device to collectively manage sessions. If such a session management device is configured by a single server, that single server is responsible for the management of all the sessions. Thus, the load on the server is large. Meanwhile, the session management device may be configured by multiple servers in some cases. However, although the session management may be split among the multiple servers, it is usually the case that the session information will in the end be managed collectively in a single database. Thus, the load on the database is large. Moreover, in the case of a failure in the server or database performing the collective management, the damage is severe.

As described above, in a usual access control system, load is imposed intensively on a particular server or the like, and therefore the whole system needs to be reinforced in advance to prepare for increase in access and for failures. Particularly, in order to maintain reliability, infrastructures need to be further augmented, which causes a problem of increasing the load on the system.

Under such circumstances, an access control system which maintains reliability and also reduces the load on a resource, such as a server, has been desired to be developed.

Thus, an object of the present invention is to provide an access control method, an access control apparatus, and an access control program capable of reducing the load on a resource and also flexibly handling increase in access.

Means for Solving the Problems

A first feature of the present invention relates to an access control method for a system comprising access control apparatuses connected bidirectionally in a communication network, each access control apparatuses including session-data storage which stores session information of a user terminal. Specifically, the access control method according to the first feature of the present invention comprises the steps: an access control apparatuses receives an update request for session information of a user terminal; the access control apparatus having received the update request identifies access control apparatuses storing therein the session information of the user terminal on the basis of an identifier of the user terminal; the access control apparatus having received the update request sends another update request for the session information of the user terminal to each of the identified access control apparatuses; each of the access control apparatuses having received the another update request updates the session-data storage of the access control apparatus having received the another update request by associating an update time; any one of the access control apparatuses receives a reference request for the session information of the user terminal; the access control apparatus having received the reference request identifies the access control apparatuses storing therein the session information of the user terminal on the basis of the identifier of the user terminal; the access control apparatus having received the reference request sends another reference request for the session information of the user terminal to each of the identified access control apparatuses; each of the access control apparatuses having received the another reference request acquires the session information of the user terminal and the update time thereof from the session-data storage of the access control apparatus having received the another reference request and sends the session information and the update time to the access control apparatus having received the reference request; and the access control apparatus having received the reference request compares the pieces of session information of the user terminal and the update times thereof received from the access control apparatuses having received the another reference request to extract the latest session information, and sends the latest session information as a reference response to the reference request.

Here, the access control method may be such that each of the access control apparatuses is capable of referring to node list data in which an identifier of each of the access control apparatuses belonging to the access control system is associated with an update flag indicating whether or not the access control apparatus is updatable and with a reference flag indicating whether or not the access control apparatus is referable. Moreover, the access control method may further comprise the steps of in a case where an access control apparatus in halt is to return to the access control system, the returning access control apparatus sends a request to change the update flag of the returning access control apparatus to indicate an updatable status, to the access control apparatuses belonging to the access control system; the returning access control apparatus receives session information to be recorded in the returning access control apparatus, from the access control apparatuses belonging to the access control system and stores the session information in the session-data storage; and once the returning access control apparatus stores the session information to be recorded in the returning access control apparatus, the returning access control apparatus sends a request to change the reference flag of the returning access control apparatus to indicate a referable status, to the access control apparatuses belonging the access control system.

Moreover, the access control method may be such that: when the access control apparatus having received the update request sends the another update request for the session information of the user terminal to the identified access control apparatuses, the access control apparatus refers to the node list data and sends the another update request for the session information of the user terminal to each access control apparatus with its update flag indicating the updatable status, among the identified access control apparatuses; and when the access control apparatus having received the reference request sends the another reference request for the session information of the user terminal to the identified access control apparatuses, the access control apparatus refers to the node list data and sends the another reference request for the session information of the user terminal to each access control apparatus with its reference flag indicating the referable status, among the identified access control apparatuses.

Furthermore, the access control method may further comprise the step of the access control apparatus having received the reference request sends an update request to the latest session information of the user terminal to any access control apparatus not storing the latest session information among the identified access control apparatuses.

A second feature of the present invention relates to an access control apparatus for a system comprising access control apparatuses which stores session information of a user terminal. Specifically, the access control apparatus according to the second feature of the present invention comprises: a session-data storage that stores session data in which an identifier of a user terminal, session information, and an update time are associated with each other; an update acceptance unit that, upon receipt of an update request for the session information of the user terminal, identifies access control apparatuses storing therein the session information of the user terminal on the basis of the identifier of the user terminal, and sends another update request for the session information of the user terminal to each of the identified access control apparatuses; an update unit that, upon receipt of the another update request, updates the session-data storage by associating session information of the user terminal and an update time with the identifier of the user terminal and, a reference acceptance unit that, upon receipt of a reference request for the session information of the user terminal, identifies the access control apparatuses storing therein the session information of the user terminal on the basis of the identifier of the user terminal, sends another reference request for the session information of the user terminal to each of the identified access control apparatuses, compares the pieces of session information of the user terminal and the update times thereof received from the access control apparatuses having received the another reference request to extract the latest session information, and sends the latest session information as a reference response to the reference request; and a reference unit that, upon receipt of the another reference request, acquires the session information of the user terminal and the update time thereof from the session-data storage and sends the session information and the update time.

Here, the access control apparatus may further comprise: a node-list-data storage that stores node list data in which an identifier of each of the access control apparatuses belonging to the access control system is associated with an update flag indicating whether or not the access control apparatus is updatable and with a reference flag indicating whether or not the access control apparatus is referable; and a node control unit that, in a case where the access control apparatus is to be added to the access control system, sends a request to change the update flag of the access control apparatus to indicate an updatable status, to the access control apparatuses belonging to the access control system, receives session information to be recorded in the access control apparatus, from the access control apparatuses belonging to the access control system, and stores the session information in the session-data storage, and once storing the session information to be recorded in the access control apparatus, sends a request to change the reference flag of the access control apparatus to indicate a referable status, to the access control apparatuses belonging to the access control system.

Moreover, the access control apparatus may be such that: upon receipt of the update request, the update acceptance unit refers to the node list data and sends the update request for the session information of the user terminal to each access control apparatus with its update flag indicating the updatable status, among the identified access control apparatuses; and upon receipt of the reference request, the reference acceptance unit refers to the node list data and sends the reference request for the session information of the user terminal to each access control apparatus with its reference flag indicating the referable status, among the identified access control apparatuses.

Furthermore, the access control apparatus may be such that the reference acceptance unit further sends an update request to the latest session information of the user terminal to any access control apparatus not storing the latest session information among the identified access control apparatuses.

A third feature of the present invention relates to an access control program being on a non-transitory computer-readable storage medium for a system comprising access control apparatuses which stores session information of a user terminal. Specifically, the access control program according to the third feature of the present invention causes a computer to function as: an update acceptance unit that, upon receipt of an update request for the session information of the user terminal, identifies access control apparatuses storing therein the session information of the user terminal on the basis of an identifier of the user terminal, and sends another update request for the session information of the user terminal to each of the identified access control apparatuses; an update unit that, upon receipt of the another update request, updates a session-data storage that stores session data in which the identifier of the user terminal, the session information, and an update time thereof are associated with each other, by associating session information of the user terminal and an update time with the identifier of the user terminal; a reference acceptance unit that, upon receipt of a reference request for the session information of the user terminal, identifies the access control apparatuses storing therein the session information of the user terminal on the basis of the identifier of the user terminal, sends another reference request for the session information of the user terminal to each of the identified access control apparatuses, compares the pieces of session information of the user terminal and the update times thereof received from the access control apparatuses having received the another reference request to extract the latest session information, and sends the latest session information as a reference response to the reference request; and a reference unit that, upon receipt of the another reference request, acquires the session information of the user terminal and the update time thereof from the session-data storage and sends the session information and the update time.

A fourth feature of the present invention relates to an access control method for a system comprising an acceptance apparatus and a plurality of access control apparatuses connected bidirectionally in a communication network, the acceptance apparatus being configured to accept an update or reference request for session information of a user terminal, each access control apparatus including a session-data storage which stores the session information of a user terminal. The access control method according to the fourth feature of the present invention comprises the steps: the acceptance apparatus receives an update request for session information of a user terminal; the acceptance apparatus identifies access control apparatuses storing therein the session information of the user terminal on the basis of an identifier of the user terminal; the acceptance apparatus sends another update request for the session information of the user terminal to each of the plurality of identified access control apparatuses; each of the access control apparatuses having received the another update request updates the session-data storage of the access control apparatus having received the another update request by associating an update time; the acceptance apparatus receives a reference request for the session information of the user terminal; the acceptance apparatus identifies the access control apparatuses storing therein the session information of the user terminal on the basis of the identifier of the user terminal; the acceptance apparatus sends another reference request for the session information of the user terminal to each of the identified access control apparatuses; each of the access control apparatuses having received the another reference request acquires the session information of the user terminal and the update time thereof from the session-data storage of the access control apparatus having received the another reference request and sends the session information and the update time to the acceptance apparatus; and the acceptance apparatus compares the pieces of session information of the user terminal and the update times thereof received from the access control apparatuses having received the another reference request to extract the latest session information, and sends the latest session information as a reference response to the reference request.

Effect of the Invention

According to the present invention, it is possible to provide an access control method, an access control apparatus, and an access control program capable of reducing the load on a resource and also flexibly handling increase in access.

BRIEF DESCRIPTION OF THE DRAWINGS

FIG. 6 is a diagram describing the data structure of session data in the access control apparatus according to the embodiment of the present invention.

FIG. 7 is a diagram describing the data structure of service order data in the access control apparatus according to the embodiment of the present invention.

FIG. 8 is a diagram describing the data structure of node list data in the access control apparatus according to the embodiment of the present invention.

FIG. 22 is a diagram describing function blocks of an acceptance apparatus according to the modification of the present invention.

FIG. 23 is a diagram describing function blocks of each access control apparatus to the modification of the present invention.

MODES FOR CARRYING OUT THE INVENTION

Figure 1:
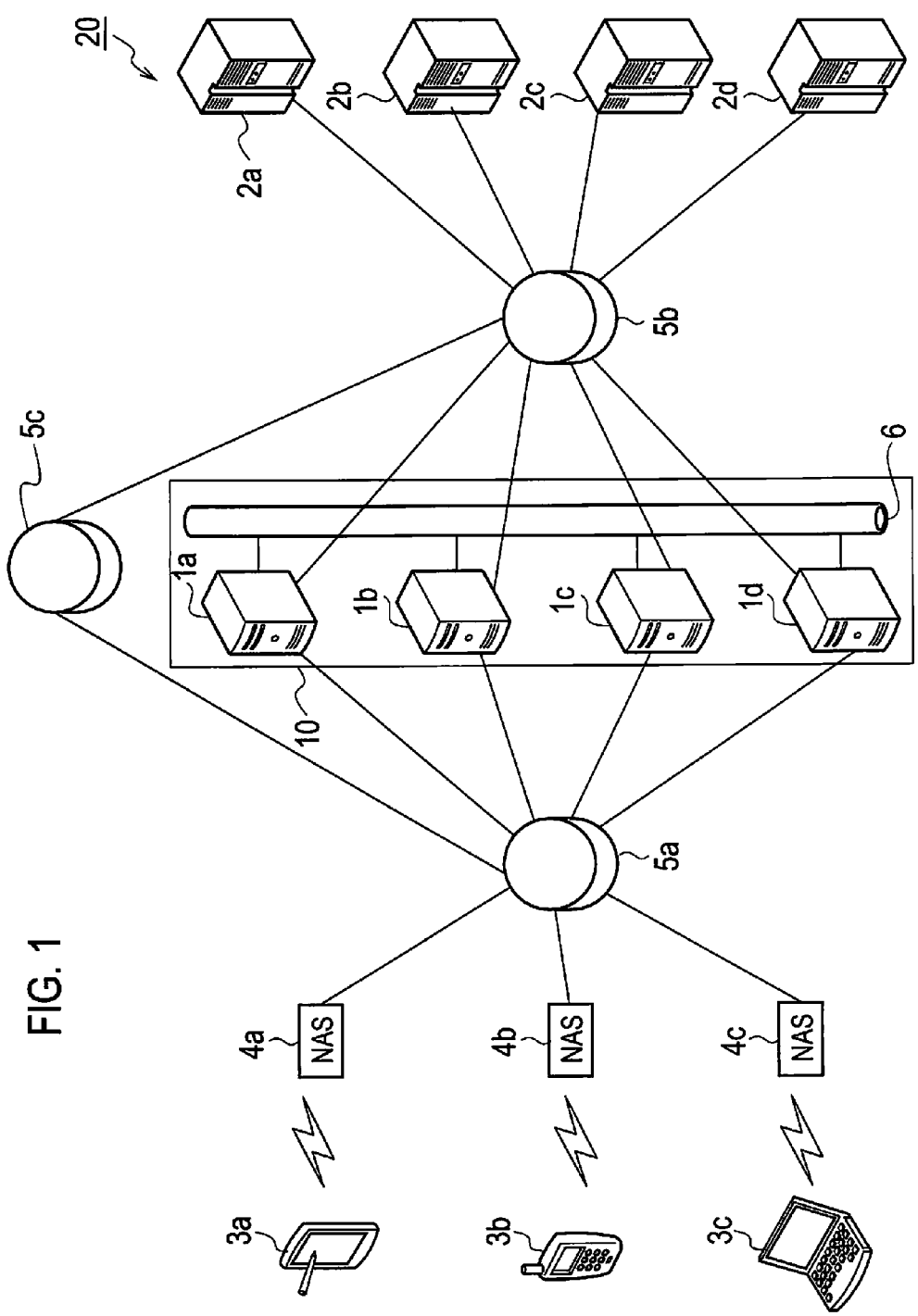
FIG. 1 is a diagram describing the system configuration of a communication system according to an embodiment of the present invention.

Next, an embodiment of the present invention will be described with reference to the drawings. In the following description of the drawings, the same or similar portions are denoted by the same or similar reference numerals.

In the embodiment of the present invention, a reference request is a request to refer to session information sent from a sender terminal to an access control system 10. An update request is a request to update session information sent from a sender terminal to the access control system 10. On the other hand, a new reference request (another reference request) is a request to refer to session information sent within the access control system 10. A new update request (another update request) is a request to update session information sent within the access control system 10.

(Communication System)

A communication system 20 according to the embodiment of the present invention will be described with reference to FIG. 1.

The communication system 20 includes service processing systems 2a, 2b, 2c, and 2d, user terminals 3a, 3b, and 3c, NASes 4a, 4b, and 4c, and the access control system 10. In the example shown in FIG. 1, there are four service processing systems 2, three user terminals 3, three NASes 4, and four access control apparatuses 1 in the access control system 10. However, the quantities may be larger or smaller. In this embodiment, the service processing systems 2a, 2b, 2c, and 2d may be described simply as the service processing system(s) 2 when the service processing systems 2a, 2b, 2c, and 2d are not particularly distinguished from one another. Likewise, the user terminals 3a, 3b, and 3c may be described as the user terminal(s) 3, and the NASes 4a, 4b, and 4c may be described as the NAS(es) 4.

The NAS 4 and the access control system 10 are connected by a communication network 5a in such a way as to be capable of communicating with each other bidirectionally. The access control system 10 and the service processing system 2 are connected by a communication network 5b in such a way as to be capable of communicating with each other bidirectionally. The communication network 5a and the communication network 5b are connected by a communication network 5c in such a way as to be capable of communicating with each other. The communication network 5a, the communication network 5b, and the communication network 5c may be networks such as LANs provided individually. Alternatively, these communication networks may be a single network sharing a broadband communication network such as the Internet.

The user terminal 3 is a mobile phone, a computer with a communication card, or the like, for example. The user terminal 3 can be connected to the service processing system 2 through the NAS 4 and the access control system 10 to receive the service of the service processing system 2.

The NAS 4 is a network access server. The NAS 4 accepts a connection from the user terminal 3 and requests authentication to the access control system 10. If the user terminal 3 is authenticated, the NAS 4 connects the user terminal 3 to its connection destinations such as the communication networks 5b and 5c and the service processing system 2a. Here, the NAS 4 sends the access control system 10 an update request containing information on the session between the user terminal 3 and the NAS 4 and makes the access control system 10 manage the session information. The NAS 4 is, for example, a GGSN (Gateway GPRS Support Node) in a case where the user terminal 3 is a mobile terminal such as a mobile phone compatible with 3G.

The service processing system 2 is a system which provides the user terminal 3 with a service on the basis of a service order. For example, the service processing system 2 provides the user terminal 3 with a location-information providing service using GPS (Global Positioning System). When providing the user terminal 3 with the service, the service processing system 2 inquires of the access control system 10 a service order available to the user terminal 3 and its connection status.

The access control system 10 includes multiple access control apparatuses 1a, 1b, 1c, and 1d which record the session information of each user terminal 3. In the example shown in FIG. 1, the access control system 10 includes four access control apparatuses 1a, 1b, 1c, and 1d, but the quantity may be larger or smaller. In this embodiment, the access control apparatuses 1a, 1b, 1c, and 1d may be described simply as the access control apparatus(es) 1 when the access control apparatuses 1a, 1b, 1c, and 1d are not particularly distinguished from one another.

The access control system 10 is installed in a given location in a data center or the like, for example, and is connected to servers, terminals, and the like in remote locations through the communication networks 5a and 5b. The access control apparatus 1 includes a session-data storage part for managing the session between each user terminal 3 and its NAS 4. The session-data storage part is data in which an identifier of each user terminal 3, session information of the user terminal 3, and the time when this session information is updated are associated with each other.

In the example shown in FIG. 1, the access control system 10 includes the access control apparatuses 1a, 1b, 1c, and 1d. The access control apparatuses 1a, 1b, 1c, and 1d are connected to each other bidirectionally through an access control network 6. The access control network 6 is a high-speed network such as a LAN for connecting the access control apparatuses 1a, 1b, 1c, and 1d to each other bidirectionally. The access control network 6 is preferably installed separate from the communication networks 5a, 5b, and 5c. The access control apparatuses 1a, 1b, 1c, and 1d have a function of a RADIUS server for authentication of the user terminal 3 and manage the session information of the embodiment of the present invention.

In the access control system 10 according to the embodiment of the present invention, it is determined in advance which access control apparatus 1 is to store the session information of which user terminal 3. For example, a value obtained by inputting the identifier of the user terminal 3 into a given hash function may be used to determine which access control apparatus 1 is to store the session information of which user terminal 3. Here, the session information of one user terminal 3 may be stored in multiple access control apparatuses.

When a change is made in the session information of the user terminal 3, one of the multiple access control apparatuses 1 receives a update request. The access control apparatus 1 having received the a update request identifies the multiple access control apparatuses storing therein the session information of that user terminal 3 on the basis of the identifier of the user terminal 3 and sends a new update request to the identified access control apparatuses. The access control apparatuses having received this new update request update the session information of the user terminal 3 on the basis of the new update request. Here, the identifier of the user terminal 3 is the telephone number, identification number, IP address, or the like assigned to the user terminal 3.

Meanwhile, in the case of reference to the session information of a given user terminal 3, one of the multiple access control apparatuses 1 receives a reference request. The access control apparatus 1 having received the reference request identifies the multiple access control apparatuses storing therein the session information of that user terminal 3 on the basis of the identifier of the user terminal 3, and sends a new reference request to the identified access control apparatuses. The access control apparatuses having received this new reference request acquires the session information of the user terminal 3 on the basis of the new reference request, and returns the session information to the access control apparatus having received the reference request as a new reference response to the new reference request. If multiple reference responses are returned from the identified access control apparatuses, the latest session information is acquired from among the multiple received reference responses and then returned.

Figure 2:
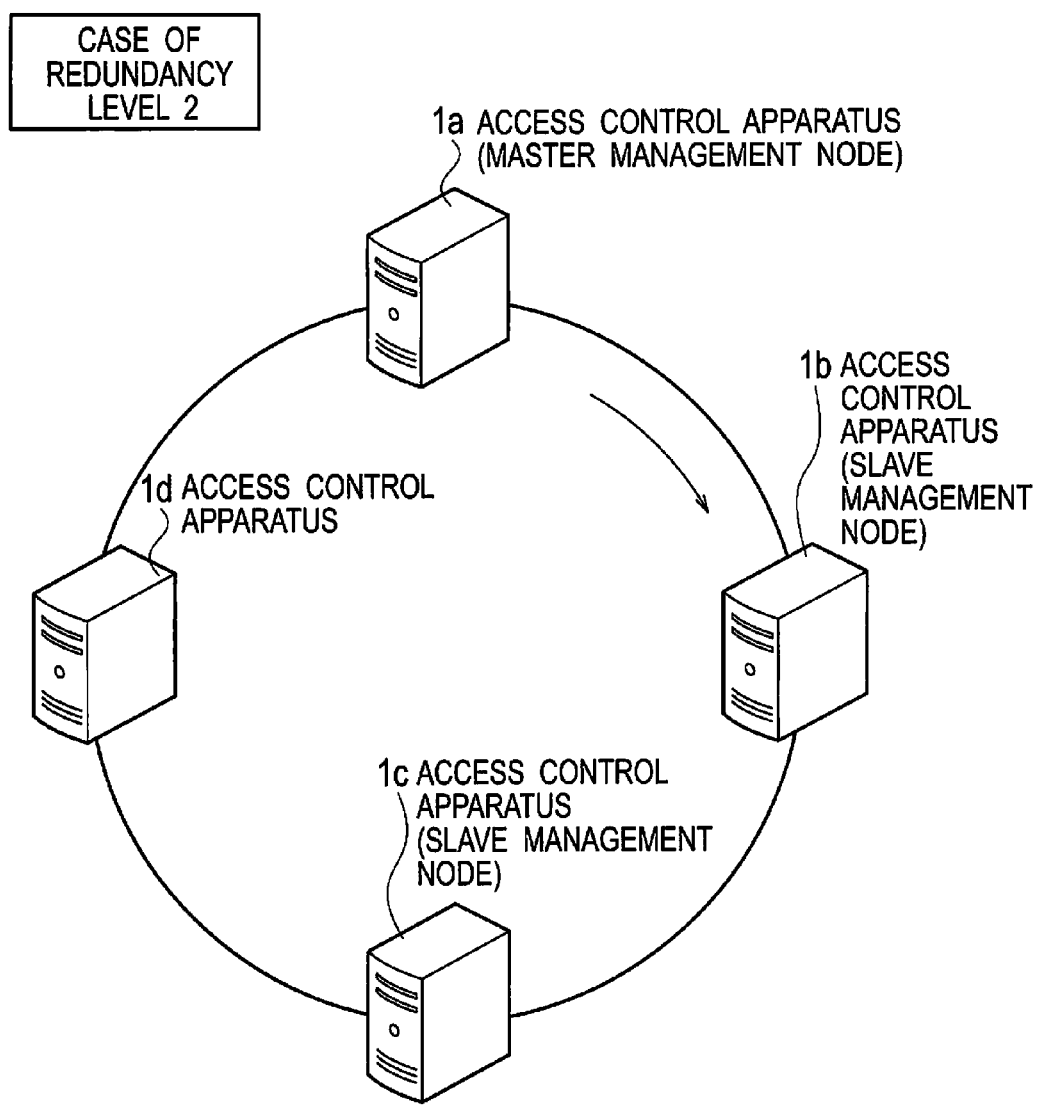
FIG. 2 is a diagram describing a redundancy level of access control apparatuses in the communication system according to the embodiment of the present invention.

A redundancy level of the access control apparatuses 1 according to the embodiment of the present invention will be described with reference to FIG. 2. When the access control system 10 receives a reference or update request from a given user terminal 3, one of the access control apparatuses identifies an access control apparatus storing therein the session information of that user terminal 3 on the basis of the identifier thereof. The identified access control apparatus is regarded as a master management node for the session information of the user terminal 3. Moreover, as shown in FIG. 2, the access control apparatuses are arranged in a loop, so that they appear in the order of the first access control apparatus 1*a*, the second access control apparatus 1*b*, . . . , the fourth access control apparatus 1*d*, the first access control apparatus 1*a* . . . . The access control apparatus 1 having received the update request newly identifies access control apparatuses located next to the identified access control apparatus clockwise in accordance with a redundancy level. Here, the newly identified access control apparatuses are regarded as slave management nodes for the session information of the user terminal 3. The slave management nodes store this session information as a backup. Moreover, the number of slave management nodes corresponds to the redundancy level which is determined in advance.

For example, in the case where the identifier of the user terminal 3 is inputted into a given hash function and the output thereof is "1," the first access control apparatus 1*a* is set as the master management node. The hash function has the number of access control apparatuses as a parameter. Assuming that the number of access control apparatuses included in the access control system is n, the hash function outputs any numerical value from 1 to n upon input of the identifier of the user terminal 3. The access control apparatus denoted by the numerical value is the master management node for the user terminal 3. Moreover, when the redundancy level is 2, the second access control apparatus 1*b* and the third access control apparatus 1*c* are the slave management nodes for backup. Thus, the session information of the user terminal 3 is stored in the first to third access control apparatuses 1. Note that when the master management node is the third access control apparatus 1*c* and the redundancy level is 2, the slave management nodes are the fourth access control apparatus 1*d* and the first access control apparatus 1*a*.

According to the access control system 10 according to the embodiment of the present invention as above, any access control apparatus 1 may process update requests and reference requests. Moreover, it is possible to reduce the load on the access control system and stably manage the session information at the same time, because the identifier of the user terminal determines which access control apparatus is to store the user's session information. Moreover, it is possible to flexibly handle failures in access control apparatuses because redundancy is provided among the access control apparatuses that store the user's session information. Thus, with the access control system 10 according to the embodiment of the present invention, load balancing in the access control system 10 can be achieved easily.

Moreover, at the time of determining which access control apparatuses are to manage which session information, each access control apparatus may be assumed to have multiple virtual nodes. For example, the first access control apparatus 1*a* includes first, fifth, and ninth virtual nodes, and the second access control apparatus 1*b* includes second, sixth, and tenth virtual nodes. Now assume that the fifth virtual node is identified as where the session information of the user terminal 3 is to be stored on the basis of the identifier of the user terminal 3, and that the redundancy level is 2. In this case, the session information of the user terminal 3 is stored in the fifth virtual node, the sixth virtual node, and the seventh virtual node. The physical nodes of these virtual nodes are the first access control apparatus 1*a*, the second access control apparatus 1*b*, and the third access control apparatus 1*c*, respectively. Thus, the session information of the user terminal 3 is stored in the first access control apparatus 1*a*, the second access control apparatus 1*b*, and the third access control apparatus 1*c*.

By identifying the physical nodes storing the session information through the virtual nodes, the session information is prevented from being stored unevenly in particular physical nodes, thus allowing the session information to be stored evenly in the physical nodes.

Figure 3:
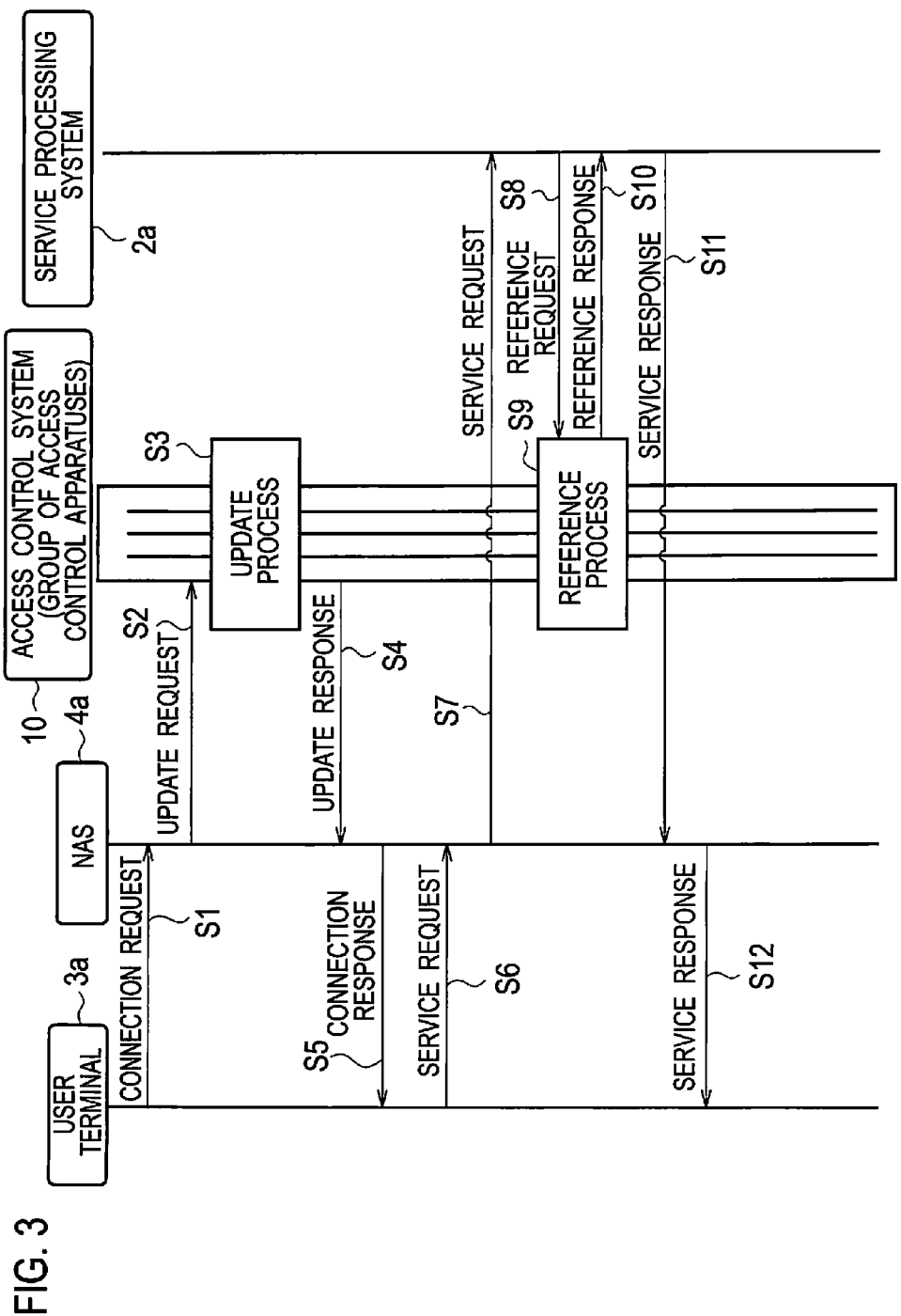
FIG. 3 is a sequence diagram describing operations of the communication system according to the embodiment of the present invention.

A communication process by the communication system 20 according to the best mode for carrying out the present invention will be described with reference to FIG. 3. In the example shown in FIG. 3, described is a case where an update request based on a connection request is sent from the user terminal 3*a* to the access control system 10, and a reference request is sent from the service processing system 2*a*. In the example shown in FIG. 3, the description is given based on an example where the NAS 4*a* receives a connection request from the user terminal 3*a* as an update request for the session information thereon and sends an update request for the session information to the access control system 10. Also, the description is given based on an example where the service processing system 2*a* sends a connection inquiry for inquiring about the connection status of the user terminal 3*a* as a reference request for the session information. Note that the process is performed similarly also when the service processing system 2a sends an update request and the user terminal 3a sends a reference request.

First, in step S1, the user terminal 3a sends the NAS 4a a connection request when connecting to the NAS 4a. In step S2, the NAS 4a sends the access control system 10 an update request for the session information. This update request contains at least the identifier of the user terminal 3a.

Upon receipt of the update request, the access control system 10 updates the session information of the user terminal 3a in step S3. For example, based on the identifier of the user terminal 3a, the access control apparatuses storing that user's session information are identified, and those identified access control apparatuses update the session information.

After the update process for the session information in the access control system 10 is finished in step S3, the access control system 10 sends, in step S4, an update response to the NAS 4a in reply to the update request in step S2. In step S5, the NAS 4a sends a connection response to the user terminal 3a in reply to step S1. The user terminal 3a can now receive the service of the service processing system 2a.

When the user terminal 3a requests the service of the service processing system 2a, the user terminal 3a sends a service request to the NAS 4a in step S6. This service request contains at least the identifier of the user terminal 3a and an identifier of the service in request. After the NAS 4a receives the service request, the NAS 4a sends, in step S7, a service request to the service processing system 2a which provides the service.

Upon receipt of the service request, the service processing system 2a sends the access control system 10 a reference request inquiring about the connection status of the user terminal 3a in step S8. This reference request contains at least the identifier of the user terminal 3a.

Upon receipt of the reference request, the access control system 10 refers to the session information of the user terminal 3a in step S9. For example, based on the identifier of the user terminal 3a, the access control apparatuses storing that user's session information are identified, and those identified access control apparatuses refer to the latest session information of the user terminal 3a.

After the access control system 10 acquires the latest session information in step S9, the access control system 10 sends the service processing system 2a a reference response containing the latest session information of the user terminal 3a in step S10, in reply to the reference request in step S8.

In step S11, the service processing system 2a sends the NAS 4a a service response to the service request in step S7, on the basis of the latest session information received in step S10. Upon receipt of the service response, the NAS 4a sends a service response to the user terminal 3a in step S12.

(Access Control Apparatus)

Figure 4:
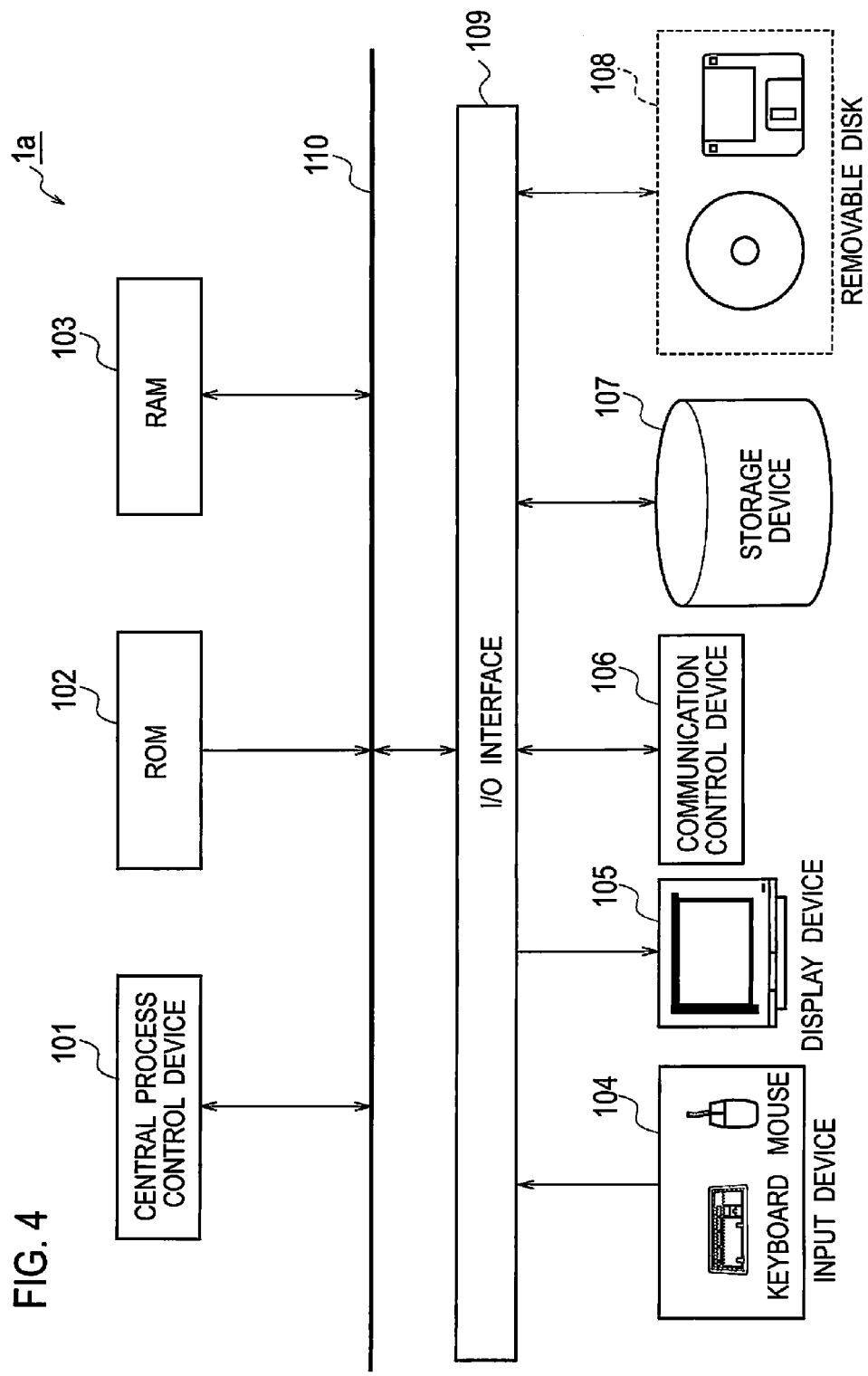
FIG. 4 is a diagram describing the hardware configuration of each access control apparatus according to the embodiment of the present invention.

As shown in FIG. 4, in each access control apparatus 1 according to the embodiment of the present invention, a central process control device 101, a ROM (Read Only Memory) 102, a RAM (Random Access Memory), and an I/O interface 109 are connected by a bus 110. Connected to the I/O interface 109 are an input device 104, a display device 105, a communication control device 106, a storage device 107, and a removable disk 108.

The central process control device 101 reads out a boot program for booting the access control apparatus 1 from the ROM 102 on the basis of an input signal from the input device 104 and executes the boot program. Further, the central process control device 101 reads out an operating system stored in the storage device 107. Meanwhile, the central process control device 101 is a processing device which: controls devices on the basis of input signals from the input device 104, the communication control device 106, and the like; reads out a program and data stored in the RAM 103 and the storage device 107 and load them onto the RAM 103; and implements a series of processes described later such as data calculation and processing on the basis of commands of the program read out from the RAM 103.

The input device 104 is constituted of input devices such as a keyboard and a mouse through which the operator inputs various operations. Based on the operator's operations, the input device 104 generates and sends input signals to the central process control device 101 through the I/O interface 109 and the bus 110. The display device 105 is a CRT (Cathode Ray Tube) display, a liquid crystal display, or the like, and is a device which receives output signals to be displayed on the display device 105 from the central process control device 101 through the bus 110 and the 110 interface 109 and displays, for example, the result of a process performed by the central process control device 101 and the like. The communication control device 106 is a device such as a LAN card or a modem which connects the access control apparatus 1 to a communication network such as the Internet or a LAN. Data sent or received by such a communication network through the communication control device 106 is sent or received by the central process control device 101 through the I/O interface 109 and the BUS 110 as an input single or an output signal.

The storage device 107 is a semiconductor storage device or a magnetic disk device and stores programs and data to be executed in the central process control device 101. The removable disk 108 is an optical disk or a flexible disk, and a signal read out from or written in the removable disk 108 by a disk drive is received or sent by the central process control device 101 through the I/O interface 109 and the BUS 110.

Figure 5:
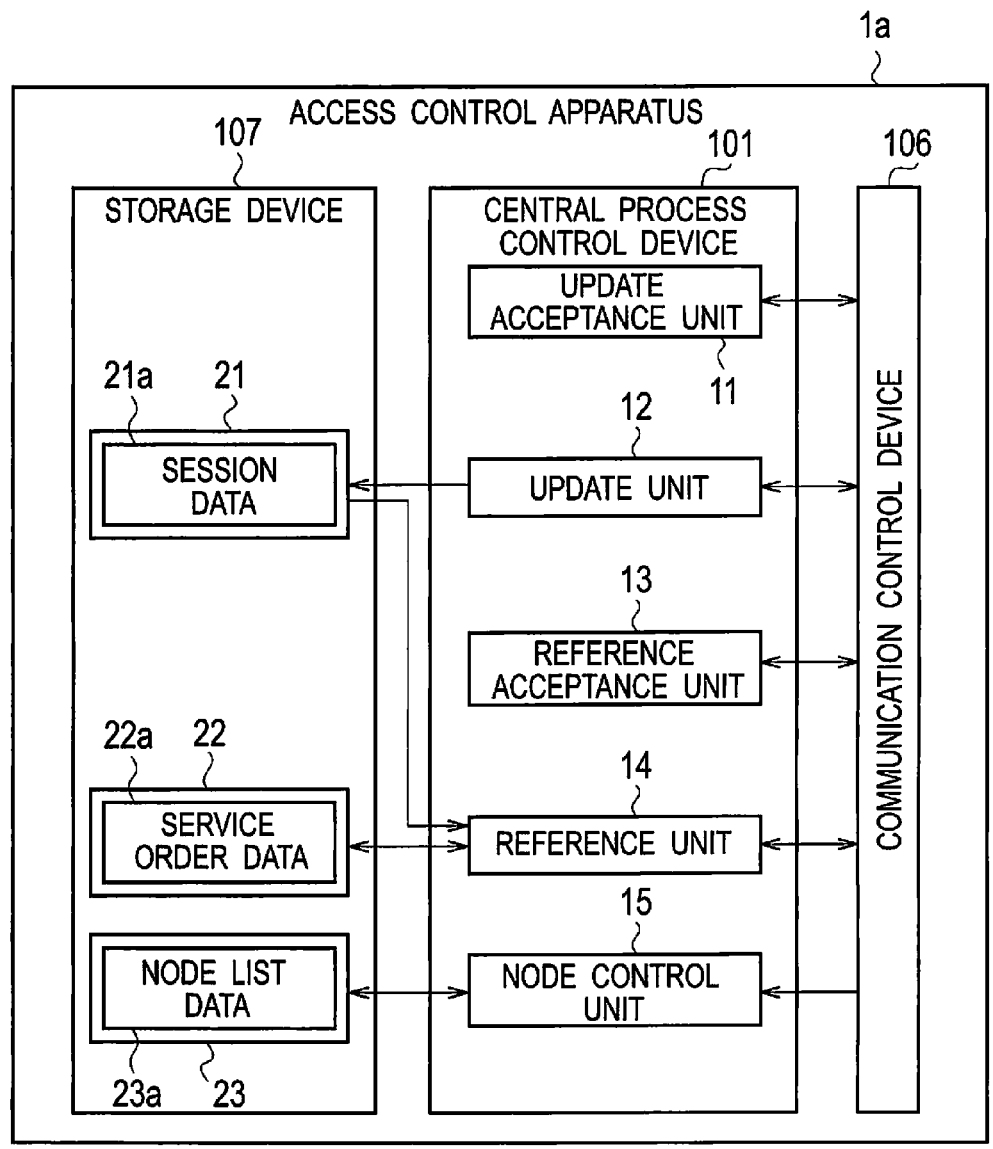
FIG. 5 is a diagram describing function blocks of the access control apparatus according to the embodiment of the present invention.

The storage device 107 of the access control apparatus 1 according to the embodiment of the present invention stores an access control program. Further, as shown in FIG. 5, the storage device 107 includes a session-data storage part 21, a service-order-data storage part 22, and a node-list-data storage part 23. Moreover, as the central process control device 101 of the access control apparatus 1 reads and executes the access control program, an update acceptance unit 11, an update unit 12, a reference acceptance unit 13, a reference unit 14, and a node control unit 15 are implemented in the access control apparatus 1.

The session-data storage part 21 is a storage area in the storage device 107 storing session data 21a. The session data 21a is the session information of the user terminals 3 managed by the access control system 10. In the embodiment of the present invention, the session data 21a contains part of the session information of the management targets of the access control system 10.

The session data 21a has a data structure shown in FIG. 6, for example. The session data 21a is data in which, for example, the identifier of each user terminal 3, the session information, and the update time are associated with each other. The session data 21a may also record data related to the provision of the service such as location information on the user terminal 3a, information on its service use history, etc. in association with the identifier of the user terminal 3. Here, the session information is information in which a session ID to identify a session, the identifier of the connection-target user terminal 3, an identifier of a connection-destination node of the user terminal 3, and the like are associated with each other.

The service-order-data storage part 22 is a storage area in the storage device 107 storing service-order data 22a. As shown in FIG. 7, the service-order data 22a is data in which the identifier of each user terminal 3 and the service order of the user terminal 3 are associated with each other. Here, the service order is a band allocated to the user terminal 3, information on a contracted service for the user terminal 3, information on the authority of the user terminal 3, information on an access filter, or the like. This service-order data 22a is periodically updated as batch processing by a server managing the service order, for example.

The node-list-data storage part 23 is a storage area in the storage device 107 storing node list data 23a. The node list data 23a is data in which the identifier of each access control apparatus 1 belonging to the access control system 10, an update flag indicating whether or not the access control apparatus 1 is updatable, and a reference flag indicating whether or not the access control apparatus 1 is referable, are associated with each other. The update acceptance unit 11 to be described later sends an new update request to an access control apparatus(es) 1 which appears as updatable in the node list data 23a. The reference acceptance unit 13 sends a new reference request to an access control apparatus(es) 1 which appears as referable in the node list data 23a.

The node list data 23a has a data structure and data as shown in FIG. 8. The node list data 23a is formed of the identifier of the access control apparatus, the update flag, and the reference flag. In the identifier of the access control apparatus, the identifiers of all the access control apparatuses belonging to the access control system 10 are set. The order of the identifiers of the access control apparatuses stored in the node list data 23a follows the procedure for determining a slave management node(s), which has been described with reference to FIG. 2. For example, when the access control apparatus in the fourth row is a master management node and the redundancy level is 2, the access control apparatus in the first row and the access control apparatus in the second row are the corresponding slave management nodes. The identifiers of the access control apparatuses can be set in any order in the node list data 23a, as long as one can figure out the master management node and the slave management node(s).

The update flag and the reference flag in the node list data 23a are updated according to the operating status of the access control apparatus 1. For example, the update flag and the reference flag are updated based on requests of the access control apparatus 1. If an access control apparatus is not temporarily in operation due to trouble or the like, "NOT AVAILABLE" is set to both of the update flag and the reference flag of that access control apparatus. When that access control apparatus starts to return to the access control system 10, the update flag is set to "AVAILABLE," and update of the access control apparatus starts. Then, once the session data 21a of the access control apparatus having returned becomes the latest one, the reference flag is set to "AVAILABLE," and reference of the access control apparatus starts.

In the example shown in FIG. 8, the statuses of each access control apparatus are presented using the update flag and the reference flag; however, the present invention is not limited to this manner. For example, it is possible to employ a method in which information on any node incapable of either update or reference is recorded in a halt node list, and information on any node capable of only update is recorded in an update node list.

Next, each processing unit implemented in the central process control device 101 will be described with reference to FIG. 5.

Upon receipt of an update request for the session information of the user terminal 3, the update acceptance unit 11 identifies the multiple access control apparatuses storing therein the session information of the user terminal 3 on the basis of the identifier of the user terminal 3. Further, the update acceptance unit 11 sends a new update request for the session information of the user terminal 3 to each of the multiple identified access control apparatuses. The update request and the new update request contain the identifier of the update-target user terminal and updated information.

The access control apparatuses 1 identified here are the master node and the slave management node(s), as has been described with reference to FIG. 3. The master management node is a node found by inputting the identifier of the user terminal 3 into a hash function. The slave management node(s) is (are) a node(s) recorded in a record(s) subsequent to the master management node in the node list data 23a. The number of slave management nodes corresponds to the redundancy level in the access control system 10 that is determined in advance.

Here, upon receipt of an update request, the update acceptance unit 11 may refer to the node list data 23a and send a new update request for the session information of the user terminal to each access control apparatus with its update flag indicating the updatable status ("AVAILABLE") among the multiple identified access control apparatuses. Moreover, if the access control apparatus of the update acceptance unit 11 is the identified node, the update acceptance unit 11 sends the new update request to its update unit 12 to be described later.

If the update is successful in the identified access control apparatuses 1, the update acceptance unit 11 receives new update responses from the access control apparatuses 1 as replies to the new update request. Upon receipt of the new update responses, the update acceptance unit 11 returns an update response to the received update request.

Here, when sending a new update request to multiple access control apparatuses 1, the update acceptance unit 11 may return an update response upon receipt of new update responses from all these access control apparatuses 1. The update acceptance unit 11 may return the update response upon receipt of at least one new update response.

Upon receipt of a new update request, the update unit 12 updates the session-data storage part 21 in association with an update time. Specifically, from the new update request, the update unit 12 acquires the identifier of the update-target user terminal and the updated information. The update unit 12 updates the session information and the update time in the session data 21a corresponding to the identifier of the user terminal acquired from the new update request, to the updated information acquired from the new update request and the current time. When the update of the session data 21a is complete, the update unit 12 returns that fact as an update response to the sender of the new update request.

The update unit 12 may receive the new update request from the update acceptance unit 11 of some other access control apparatus belonging to the access control system 10 or from its own update acceptance unit 11.

Upon receipt of a reference request for the session information of the user terminal 3, the reference acceptance unit 13 identifies the multiple access control apparatuses 1 storing therein the session information of the user terminal 3 on the basis of the identifier of the user terminal 3. Further, the reference acceptance unit 13 sends a new reference request for the session information of the user terminal 3 to each of the multiple identified access control apparatuses 1. Here, upon receipt of a reference request, the reference acceptance unit 13 may refer to the node list data 23a and send a new reference request for the session information of the user terminal 3 to each access control apparatus with its reference flag indicating the referable status ("AVAILABLE") among the multiple identified access control apparatuses 1. Moreover, if the access control apparatus of the reference acceptance unit 13 is the identified node, the reference acceptance unit 13 sends the new reference request to its reference unit 14 to be described later.

Upon receipt of new reference responses as replies to the new reference request, the reference acceptance unit 13 compares the multiple pieces of session information of the user terminal 3 and the update times thereof received from the access control apparatuses 1 having received the new reference request to extract the latest session information. The reference acceptance unit 13 sends the extracted latest session information as a reference response to the reference request.

The access control apparatuses 1 identified here are the master node and the slave management node(s), as has been described with reference to FIG. 3. The master management node is a node found by inputting the identifier of the user terminal 3 into a hash function. The slave management node(s) is (are) a node(s) recorded in a record(s) below the master management node in the node list data 23a. The number of slave management nodes corresponds to the redundancy level in the access control system 10 that is determined in advance.

The reference acceptance unit 13 uses the same hash function as that used by the update acceptance unit 11 to determine which node is to store the session information of which user terminal 3. In this way, when all the access control apparatuses 1 operate normally, the session information of a given user terminal 3 can be stored always in the same access control apparatus; hence, at the time of reference, the reference acceptance unit 13 should just refer to the session information of that access control apparatus. Moreover, by storing session information in multiple access control apparatuses in accordance with the redundancy level, it is possible to handle situations where access control apparatuses are having trouble. Specifically, when session information is updated, the session information is stored in any of its master management node and the slave management node found based on the master management node. Thus, by referring to the session information of the master management node and the slave management node, it is possible acquire the desired session information. Moreover, in the case where multiple pieces of session information are referable, the reference acceptance unit 13 regards the session information associated with the latest update time as the right session information. In this way, it is possible to eliminate the session information of any access control apparatus that has failed to update its information due to trouble or the like.

Here, the reference acceptance unit 13 may further send an update request to the latest session information of the user terminal 3 to any access control apparatus 1 that does not store the latest session information among the multiple identified access control apparatuses. This allows update to the latest session information for any access control apparatus 1 that has failed to update the session information due to trouble or the like.

Upon receipt of a new reference request, the reference unit 14 acquires the session information of the user terminal 3 and the update time thereof from the session-data storage part 21 and sends them. Specifically, the reference unit 14 acquires the identifier of the reference-target user terminal from the new reference request. The reference unit 14 acquires the session information of the acquired identifier of the user terminal and the update time thereof from the session data 21a. The reference unit 14 returns the acquired session information and update time to the sender of the new reference request.

The reference unit 14 may receive the new reference request from the reference acceptance unit 13 of some other access control apparatus belonging to the access control system 10 or from its own reference acceptance unit 13.

The node control unit 15 controls processes related to halt, return, deletion, addition, and the like of a node, or an access control apparatus 1. The node control unit 15 controls not only the process related to addition of its access control apparatus 1 but also the process related to addition of other access control apparatuses 1 to the access control system 10.

Halt of a node refers to a state where an access control apparatus 1 does not process reference and update requests. When a node is in halt, the reference flag and the update flag of the halt access control apparatus in halt are set to "NOT AVAILABLE" in the node list data of the other access control apparatuses. Return of a node refers to a state where an access control apparatus 1 in halt becomes able to process reference and update requests. When a node is to return, it starts the processing of reference requests and acquires session information from other access control apparatuses, and starts the processing of update requests once the acquisition of the session information is complete.

Deletion of a node refers to deleting that node from the access control system 10. The information held in the node to be deleted is transferred to other access control apparatuses. Addition of a node refers to adding that node to the access control system 10 and allowing it to process reference and update requests. When a node is added, that node acquires the information to be held in the node from other access control apparatuses.

The deletion and addition of a node changes the information to be held in other access control apparatuses. For example, if there are four access control apparatuses in operation in the access control system 10, the amount of information to be held in each access control apparatus 1 is equal to the number of session information to be held in the whole access control system 10×the redundancy level/4. Then, if another access control apparatus is added to the access control system 10, the information to be held in each access control apparatus 1 becomes equal to the number of session information to be held in the whole access control system 10×the redundancy level/5. Each time the deletion or addition of a node is performed, each access control apparatus 1 re-calculates the information to be held therein and transfers information to appropriate apparatuses.

For example, in the case where an access control apparatus 1 is to return to the access control system 10, the node control unit 15 of that access control apparatus 1 sends a request to change the update flag of the access control apparatus 1 to indicate the updatable status, to the access control apparatuses belonging to the access control system 10. Further, the node control unit 15 receives the session information to be recorded in its access control apparatus 1 from the access control apparatuses belonging to the access control system 10 and stores the session information in the session-data storage part 21. Furthermore, the node control unit 15, once the session information to be recorded in its access control apparatus is all stored therein, sends a request to change the reference flag of the access control apparatus to indicate the referable status, to the access control apparatuses belonging to the access control system 10.

Here, the session information to be recorded in the access control apparatus includes: the session information of each user terminal which the access control apparatus is arranged to store as a master management node; and the session information of each user terminal which the access control apparatus is arranged to store as a slave management node. In the case of adding the first access control apparatus 1a in the example shown in FIG. 2, the first access control apparatus 1a acquires the session information which it is arranged to store as a master management node, from the second access control apparatus 1b or the third access control apparatus 1c. Further, the first access control apparatus 1a acquires the session information which it is arranged to record as a slave management node of the fourth access control apparatus 1d, from the fourth access control apparatus 1d or the second access control apparatus 1b. The first access control apparatus 1a acquires the session information which it is arranged to record as a slave management node of the third access control apparatus 1c, from the third access control apparatus 1c or the fourth access control apparatus 1d.

Next, a process of the access control system 10 according to the embodiment of the present invention will be described with reference to FIG. 9. In the example shown in FIG. 9, the access control apparatus 10 includes the first access control apparatus 1a, the second access control apparatus 1b, the third access control apparatus 1c, and the fourth access control apparatus 1d. In the example shown in FIG. 9, described is a case where the update acceptance unit 11 of the first access control apparatus 1a receives an update request. In the access control system 10, the redundancy level of session information is 1, and the management nodes for the session information of the update-target user terminal 3a are the second access control apparatus 1b and the third access control apparatus 1c. Here, the master management node and the slave management node are collectively referred to as management nodes.

Figure 10:
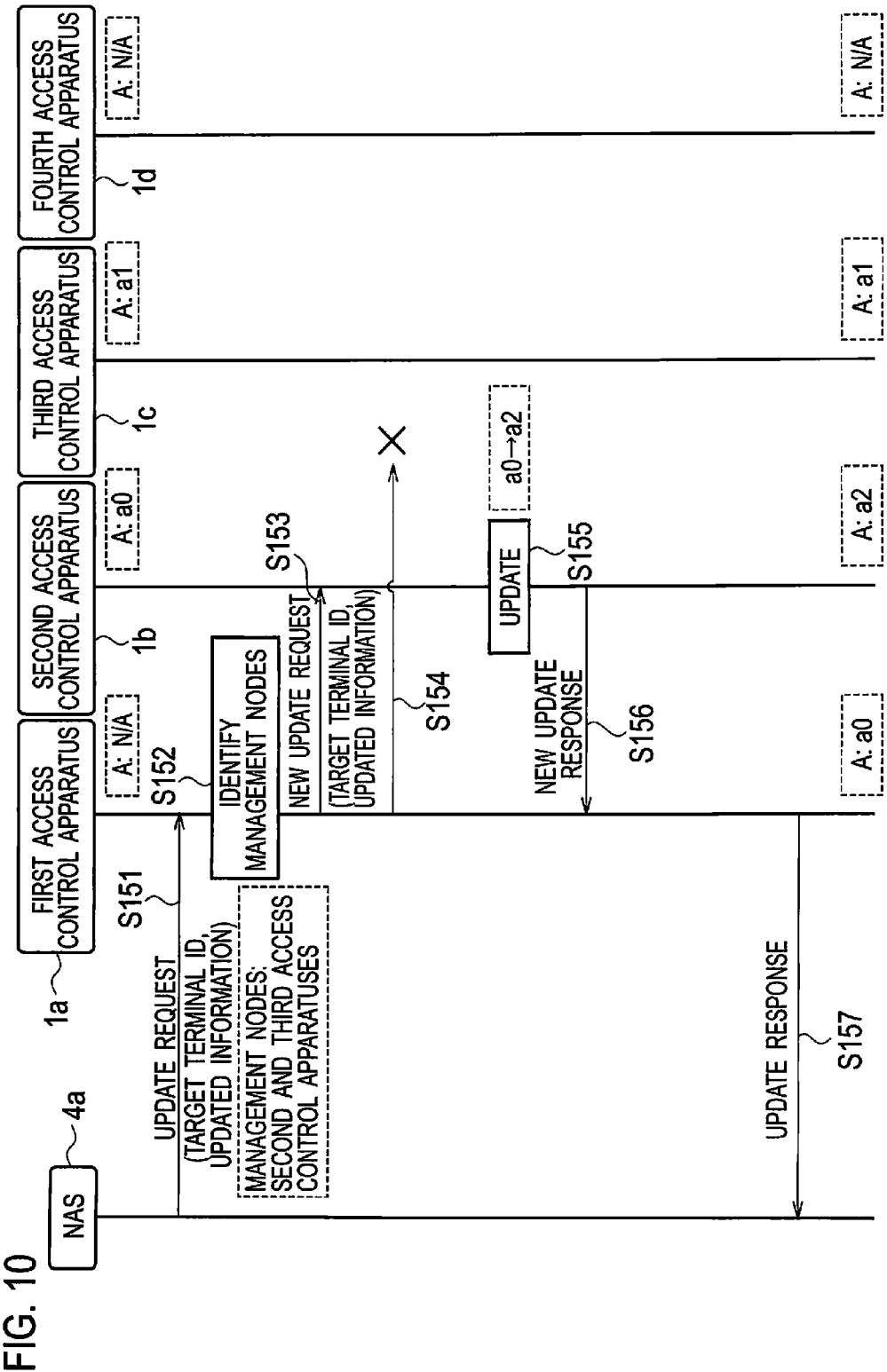
FIG. 10 is a sequence diagram describing operations of the access control system during the update process in the presence of a node that is unable to perform update, in the communication system according to the embodiment of the present invention.
Figure 11:
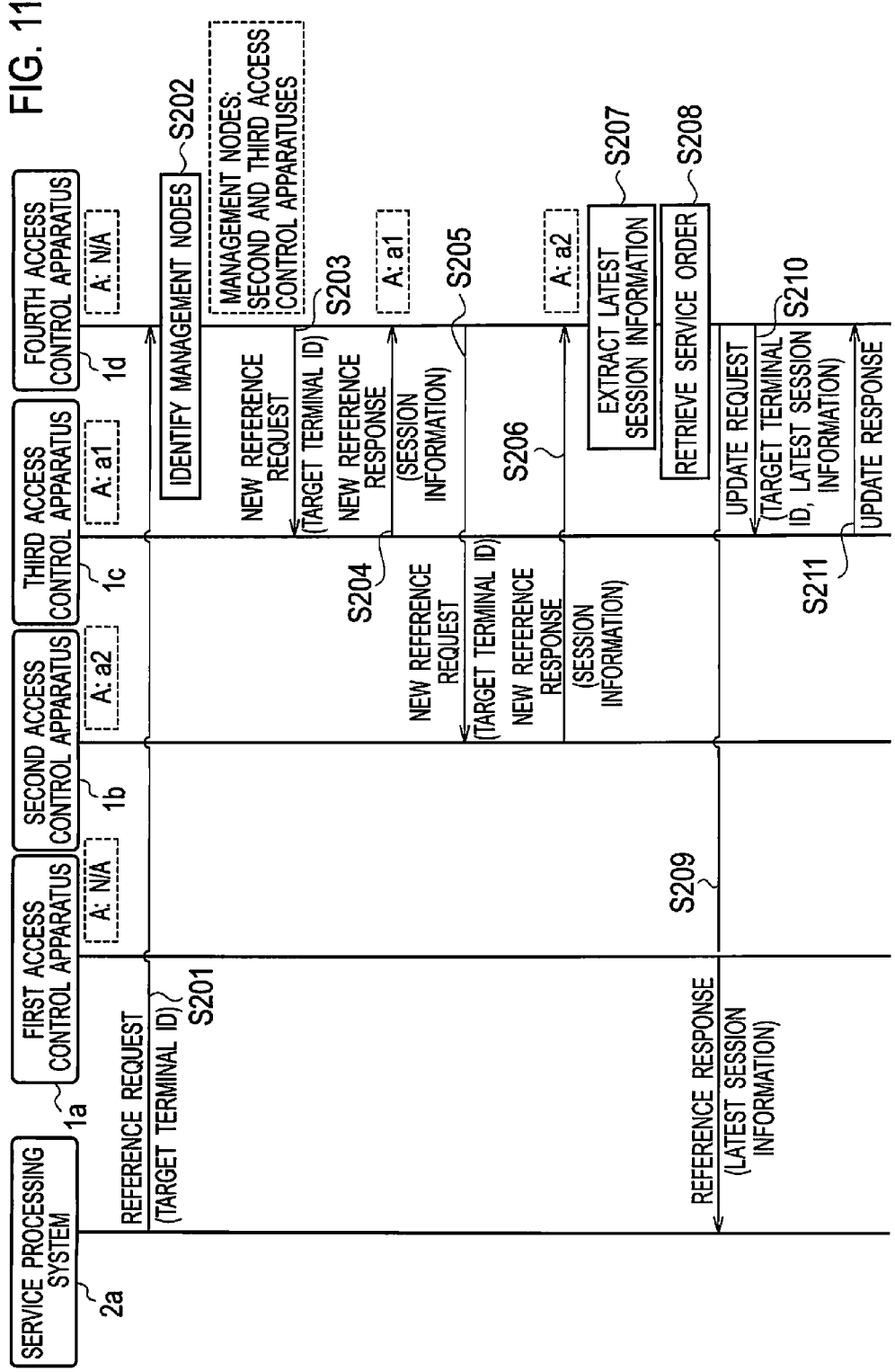
FIG. 11 is a sequence diagram describing operations of the access control system during a reference process in the communication system according to the embodiment of the present invention.

Here, the update-target terminal identifier is assumed as "A." The session information associated with the terminal identifier "A" in the session data of each access control apparatus 1 is presented as "a"+a revision number. In FIGS. 9 to 11, "a0" is the oldest session data, and "a1" is session data newer than "a0." "a2" is the latest session data to which session data is updated this time. The first access control apparatus 1a and the fourth access control apparatus 1d do not record the session information of this user terminal. Thus, the first access control apparatus 1a and the fourth access control apparatus 1d have no session information associated with the terminal identifier "A." Meanwhile, the session information associated with the terminal identifier "A" in the session data of the second access control apparatus 1b is "a0." The session information associated with the terminal identifier "A" in the session data of the third access control apparatus 1c is "a01."

First, in step S101, the first access control apparatus 1a receives an update request from the NAS 4a. This update request contains the identifier "A" of the update-target terminal and the updated information "a2" being information after being updated. In step S102, the first access control apparatus 1a identifies that the management nodes for the update-target terminal are the second and third access control apparatuses 1b and 1c, on the basis of the identifier "A" of the update-target terminal which is contained in the update request received in step S101.

Then, in steps S103 and S104, the first access control apparatus 1a sends a new update request to update the session information to the management nodes identified in step S102. This new update request contains the identifier "A" of the update-target terminal and the updated information "a2" being information after being updated.

The second access control apparatus 1b receives the new update request from the first access control apparatus 1a in step S103 and then updates the session data thereof in step S105. The second access control apparatus 1b changes the session information of the identifier "A" of the update-target terminal from "a0" to "a2." Further, in step S106, the second access control apparatus 1b sends the first access control apparatus 1a a new update response to the new update request received in step S103.

Likewise, the third access control apparatus 1c receives the new update request from the first access control apparatus 1a in step S104 and then updates the session data thereof in step S107. The third access control apparatus 1c updates the session information of the identifier "A" of the update-target terminal from "a1" to "a2." Further, in step S108, the third access control apparatus 1c sends the first access control apparatus 1a a new update response to the new update request received in step S104.

Once confirming that the session information is updated in at least one of the management nodes, the first access control apparatus 1a sends the NAS 4a an update response to the update request received in step S101. Here, the first access control apparatus 1a may send an update response in step S109 upon receipt of a new update response from a predetermined number of nodes according to the redundancy level. For example, when the redundancy level is 2, there are three management nodes, and the first access control apparatus 1a therefore sends a new update request to three access control apparatuses. In this case, the first access control apparatus 1a may send an update response when update is done in one of them or when the update is done two of them. While increasing the number of nodes necessary for sending an update response increases the load on the access control system 10, it increases reliability.

As described above, in the example shown in FIG. 9, the session information of the update-target terminal identifier is updated in all the management nodes in the access control system 10. Thus, regardless of which management node receives a reference request, the session information to be referred to is the same. However, there are also cases where one of the management nodes fails to update the session information due to trouble.

An example of such cases will be described with reference to FIG. 10. Processes in steps S151 to S154 shown in FIG. 10 are the same as the processes in steps S101 to S104 in FIG. 9.

Figure 9:
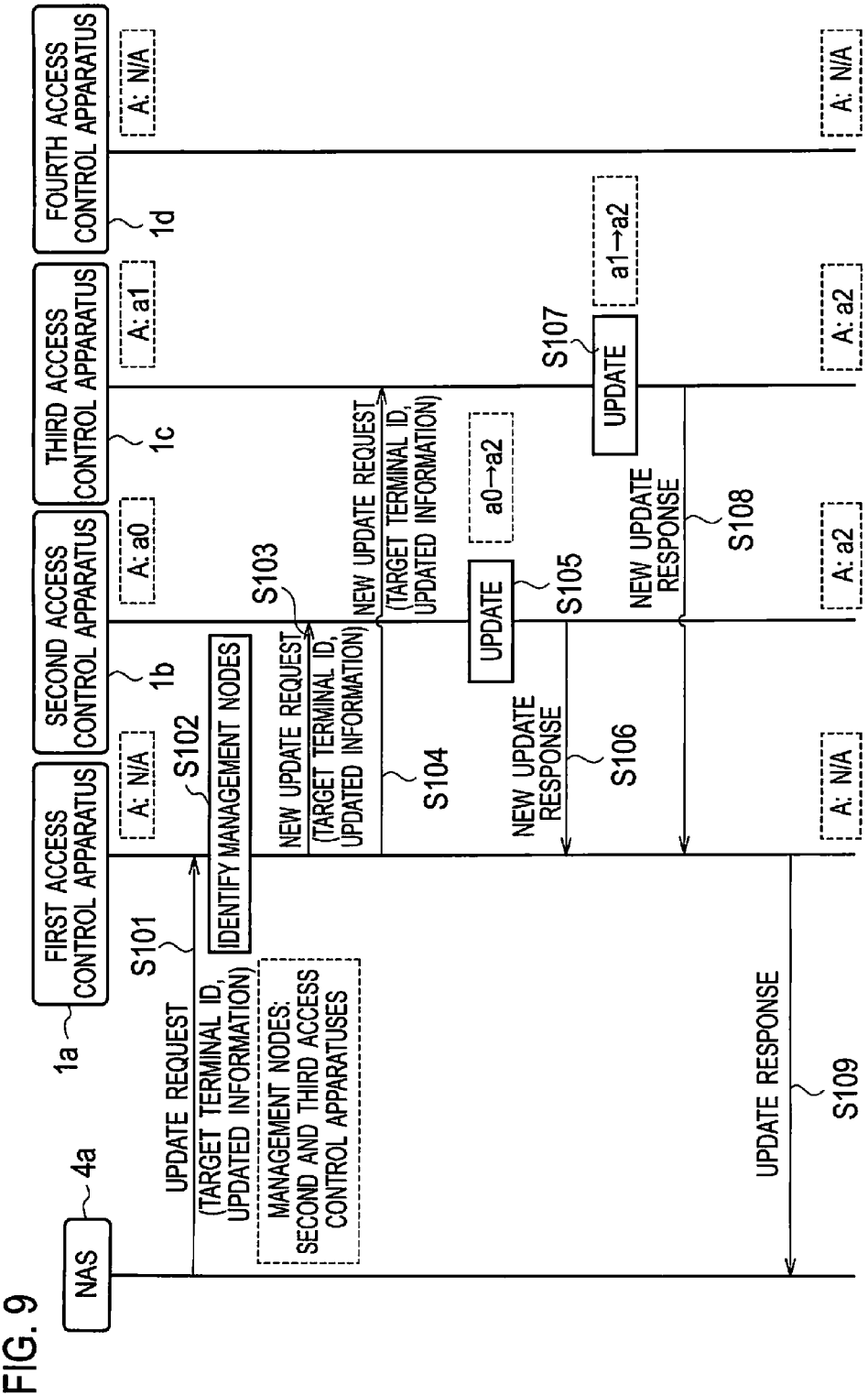
FIG. 9 is a sequence diagram describing operations of the access control system during an update process in the communication system according to the embodiment of the present invention.

As in the case of FIG. 9, the second access control apparatus 1b normally receives a new update request and sends a new update response to the first access control apparatus 1a. Specifically, upon receipt of the new update request, the second access control apparatus 1b changes the session information of the identifier "A" of the update-target terminal from "a0" to "a2" in step S155. Once the update is complete, the second access control apparatus 1b sends, in step S156, a new update response to the first access control apparatus 1a in reply to the new update request received in step S153.

The third access control apparatus 1c fails to receive the new update request. In this case, no update is performed in the third access control apparatus 1c, and no new update response is sent either, as a matter of course. Accordingly, in the session data of the third access control apparatus 1c, the session information of the identifier "A" of the update-target terminal remains as "a1."

Here, the first access control apparatus 1a sends the new update request to the second access control apparatus 1b and the third access control apparatus 1c but receives the new update response only from one node, i.e. the second access control apparatus 1b. Thus, if settings are such that an update response is sent upon receipt of a new update response from one or more access control apparatuses, the first access control apparatus 1a can send an update response in step S157. On the other hand, if the settings are such that an update response is sent upon receipt of a new update response from two or more access control apparatuses, the first access control apparatus a cannot send an update response in step S157. In this case, the NAS 4a re-sends the update request, for example.

Thus, even when the session information is not updated in all the management nodes, the access control system 10 according to the embodiment of the present invention can acquire the latest session information if the session information is updated to the latest session information in at least one of the access control apparatuses. This process will be described with reference to FIG. 11. In FIG. 11, the latest session information "a2" is associated as the session information of the terminal identifier "A" in the second access control apparatus 1b. On the other hand, the older session information "a1" is associated as the session information of the terminal identifier "A" in the third access control apparatus 1c. In FIG. 11, described is a case where the reference acceptance unit 13 of the fourth access control apparatus 1d receives a reference request for the terminal identifier "A," and the reference unit 14 of each of the second access control apparatus 1b and the third access control apparatus 1c receives a new reference request.

First, in step S201, the fourth access control apparatus 1d receives a reference request. Here, the reference request contains the identifier of the reference-target user terminal. Then, in step S202, the fourth access control apparatus 1d identifies the nodes to send a new reference request on the basis of the identifier of the target terminal. In this example, the second access control apparatus 1b and the third access control apparatus 1c are assumed to be identified as the management nodes.

Then, the fourth access control apparatus 1d sends a new reference request to the third access control apparatus 1c in step S203 and receives a new reference response as a reply thereto from the third access control apparatus 1c in step S204. The new reference request contains the identifier "A" of the reference-target user terminal. Upon receipt of the new reference request from the fourth access control apparatus 1d, the third access control apparatus 1c acquires the session information "a1" associated with the identifier "A" of the reference-target user terminal and the update time thereof from the session data in the third access control apparatus 1c. Further, in step S204, the third access control apparatus 1c sends the fourth access control apparatus 1d the session information "a1" and the update time thereof as a new reference response to step S203.

Further, the fourth access control apparatus 1d sends a new reference request to the second access control apparatus 1b in step S205 and receives a new reference response as a reply thereto from the second access control apparatus 1b in step S206. The new reference request contains the identifier "A" of the reference-target user terminal. Upon receipt of the new reference request from the fourth access control apparatus 1d, the second access control apparatus 1b acquires the session information "a2" associated with the identifier "A" of the reference-target user terminal and the update time thereof from the session data in the second access control apparatus 1b. Further, in step S206, the second access control apparatus 1b sends the fourth access control apparatus id the session information "a2" and the update time thereof as a new reference response to step S205.

In step S207, the fourth access control apparatus id acquires the latest session information. The fourth access control apparatus 1d has acquired, in steps S204 and S206, the session information of the reference-target user terminal "A" and the update time thereof from each of the second access control apparatus 1b and the third access control apparatus 1c.

The fourth access control apparatus 1d determines the session information with the latest update time, among the acquired update times, as the latest session information. In the example shown in FIG. 11, the update time received from the second access control apparatus 1b is the latest one. Accordingly, the fourth access control apparatus 1d determines the session information "a2" received from the second access control apparatus 1b as the latest information on the reference-target user terminal "A."

Further, in step S208, the fourth access control apparatus 1d refers to the service-order data 22a to retrieve information on the service order corresponding to the reference-target user terminal "A," in a case where the reference request received in step S201 contains a service-order inquiry.

In step S209, the fourth access control apparatus 1d sends a reference response to the service processing system 2a in reply to the reference request received in step S201. The reference response sent here contains the latest session information extracted in step S207. This reference response may further contain the service-order information retrieved in step S208.

Then, in step S210, the fourth access control apparatus 1d may send a request for update to the latest session information to the access control apparatus that has sent the older of the pieces of session information received from the access control apparatuses in steps S204 and S206. Specifically, in the example shown in FIG. 11, the third access control apparatus 1c is a management node for the user terminal "A" but does not hold the latest session information thereon. Thus, the fourth access control apparatus 1d sends an update request to the third access control apparatus 1c in step S210. This update request contains the identifier of the update-target user terminal and the latest session information thereon. Upon receipt of the update request from the fourth access control apparatus 1d, the third access control apparatus 1c updates the session information corresponding to the identifier of the update-target user terminal in its session data to the latest session information. Further, in step S211, the third access control apparatus 1c sends an update response to the fourth access control apparatus 1d in reply to step S210.

Figure 12:
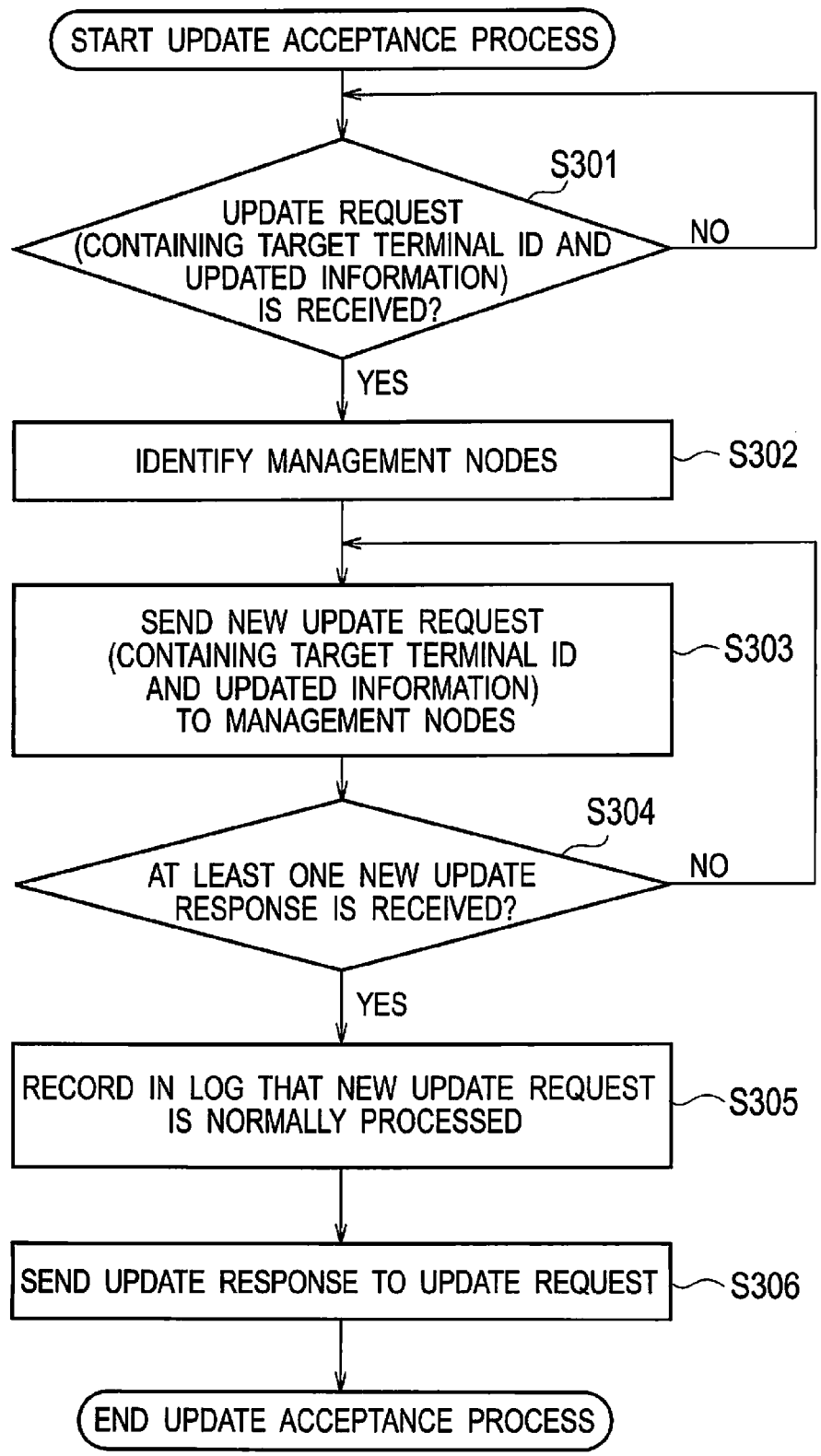
FIG. 12 is a flowchart describing an update acceptance process by an update acceptance unit of the access control apparatus according to the embodiment of the present invention.

An update acceptance process by the update acceptance unit 11 of the access control apparatus 1a according to the embodiment of the present invention will be described with reference to FIG. 12. The update acceptance process is executed when an update request is received. Note that in the example shown in FIG. 12, a new update request is determined as being successfully sent, when at least one new update response is received.

First, when the update acceptance unit 11 of the access control apparatus 1a receives an update request in step S301, the update acceptance unit 11 proceeds to step S302. This update request contains the update-target terminal identifier and the updated session information thereof. In step S302, the update unit 12 identifies the management nodes on the basis of the update-target terminal identifier contained in the update request.

Further, in step S303, the update acceptance unit 11 sends a new update request to the management nodes identified in step S302. This new update request contains the identifier of the update-target terminal and the updated session information thereof. Here, the update acceptance unit 11 refers to the node list data 23a and sends the new update request only to each access control apparatus with its update flag being "AVAILABLE" among the identified access control apparatuses.

Then, in step S304, the update acceptance unit 11 waits to receive, for example, at least one new update response from the management nodes as a reply to the new update request sent in step S303. If receiving no new update response within a predetermined period of time, the update acceptance unit 11 may return to step S303 and send the new update request again to the management nodes.

If receiving at least one new update response in step S304, the update acceptance unit 11 determines that the new update request has been sent successfully in step S303, and records that fact in log data in step S305. Further, in reply to the update request received in step S301, the update acceptance unit 11 sends an update response to the sender of the update request in step S306.

Figure 13:
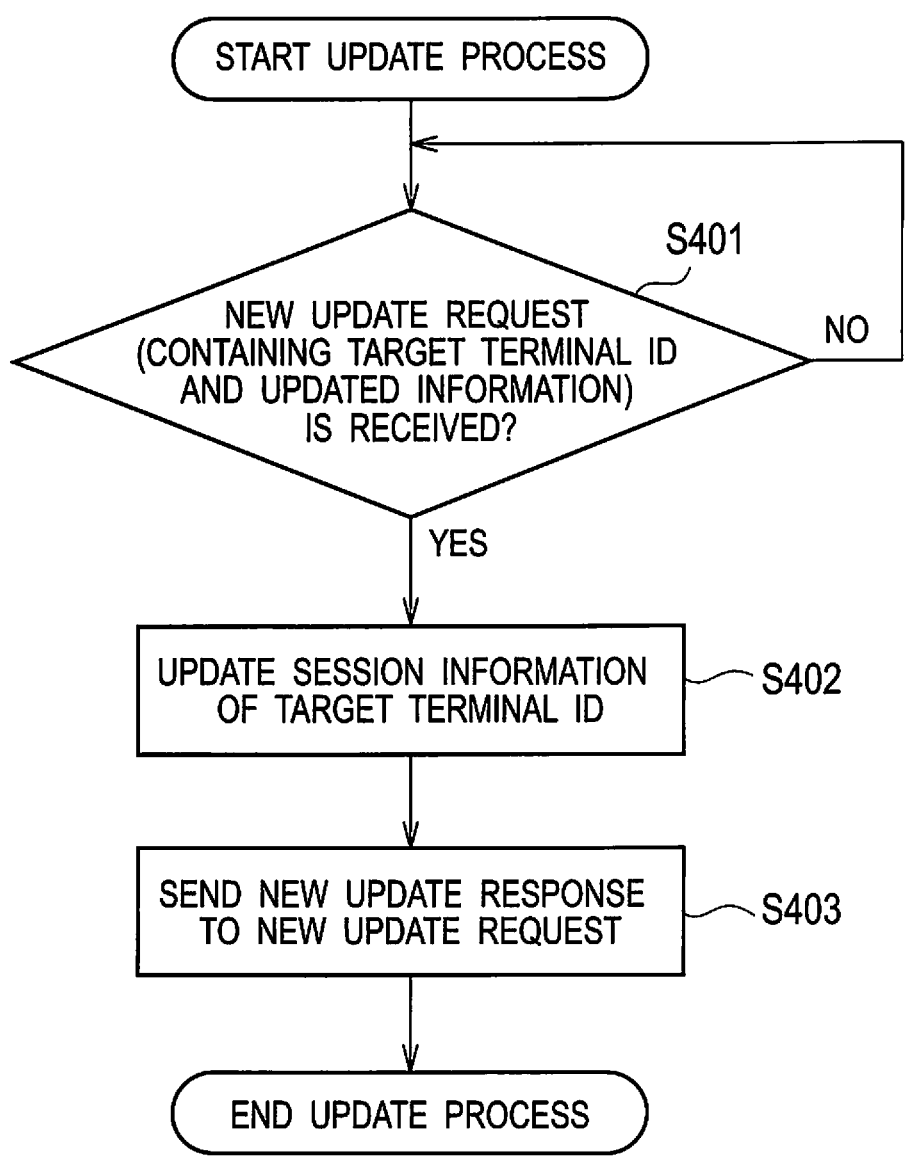
FIG. 13 is a flowchart describing the update process by an update unit of the access control apparatus according to the embodiment of the present invention.

Next, an update process by the update unit 12 of the access control apparatus 1a according to the embodiment of the present invention will be described with reference to FIG. 13. The update process is executed when a new update request is received.

First, when the update unit 12 of the access control apparatus 1a receives a new update request in step S401, the update unit 12 proceeds to step S402. This new update request contains the update-target terminal identifier and the updated session information thereof. In step S402, the update unit 12 refers to the session data 21a and updates the session information of the update-target terminal identifier to the updated session information. Further, in reply to the new update request received in step S401, the update unit 12 sends a new update response to the sender of the new update request in step S403.

Figure 14:
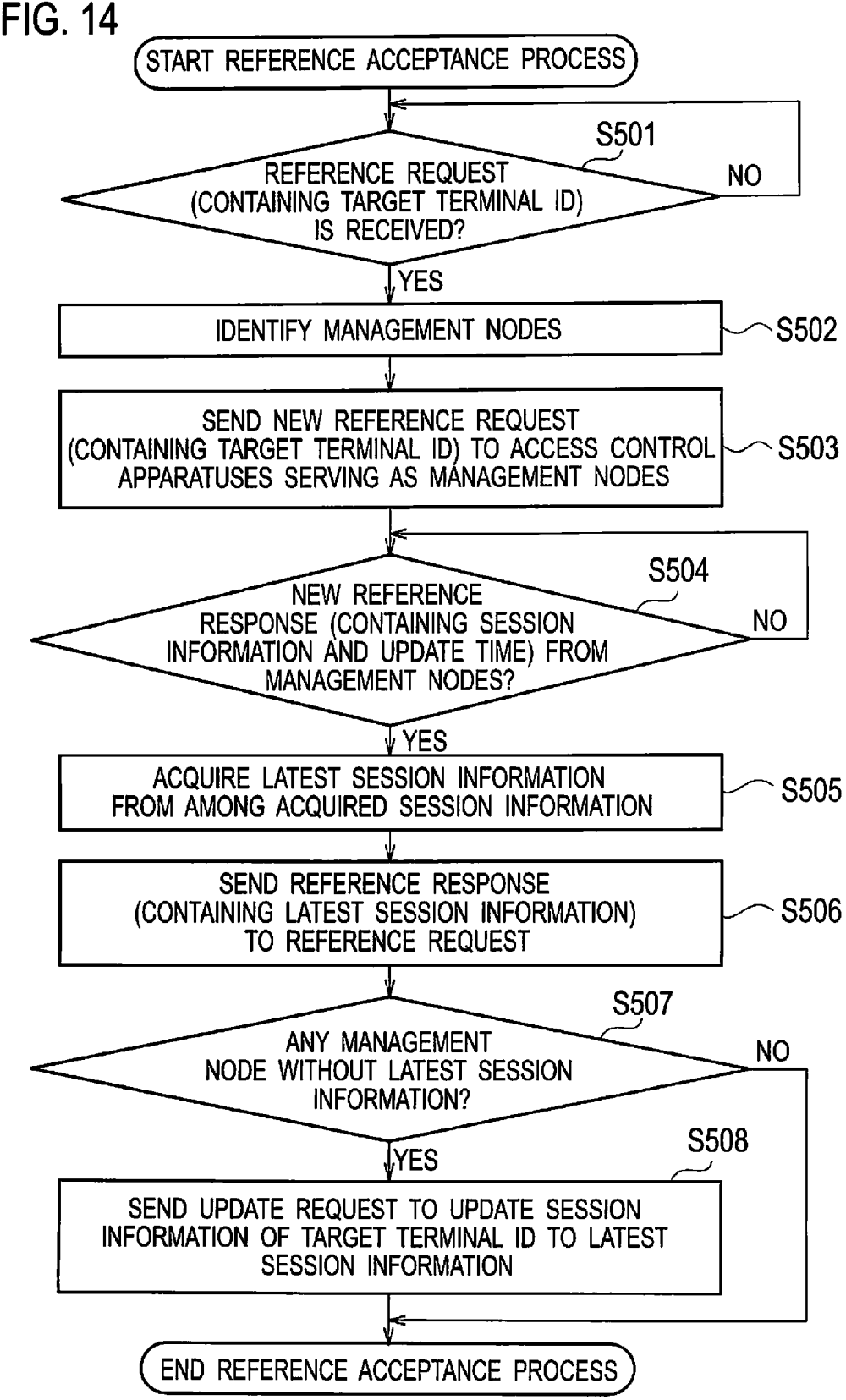
FIG. 14 is a flowchart describing a reference acceptance process by a reference acceptance unit of the access control apparatus according to the embodiment of the present invention.

Next, a reference acceptance process by the reference acceptance unit 13 of the access control apparatus 1a according to the embodiment of the present invention will be described with reference to FIG. 14. The reference acceptance process is executed when a reference request is received.

First, when the reference acceptance unit 13 of the access control apparatus 1a receives a reference request in step S501, the reference acceptance unit 13 proceeds to step S502. This reference request contains the reference-target terminal identifier. In step S502, the reference acceptance unit 13 identifies the management nodes on the basis of the reference-target terminal identifier contained in the reference request.

In step S503, the reference acceptance unit 13 sends a new reference request to the access control apparatuses identified in step S502. This new reference request contains the reference-target terminal identifier. Here, the reference acceptance unit 13 refers to the node list data 23a and sends the new reference request only to each access control apparatus with its reference flag being "AVAILABLE" among the identified access control apparatuses.

Then, in step S504, the reference acceptance unit 13 waits to receive a new reference response as a reply to the new reference request. Here, the reference acceptance unit 13 may wait to receive a new reference response from all the management nodes identified in step S502 or wait to receive a new reference response from at least two management nodes. Moreover, the reference acceptance unit 13 may wait for a predetermined period of time to receive a new reference response.

Then, in step S505, the reference acceptance unit 13 acquires the latest session information from among the pieces of session information acquired in step S504. Specifically, the reference acceptance unit 13 acquires the session information with the most recent update time as the latest session information.

In reply to the reference request received in step S501, the reference acceptance unit 13 sends a reference response to the sender of the reference request in step S506. This reference response contains the latest session information acquired in step S505.

Then, in step S507, the reference acceptance unit 13 determines whether or not there is any older session information among the pieces of session information received in step S504. If there is any older session information, the reference acceptance unit 13 sends an update request for the session information to each management node holding the older session information in step S508. This update request contains the update-target terminal identifier and the latest session information thereof.

On the other hand, the reference acceptance unit 13 ends the process if there is no older session information in step S507, that is, if the latest session information is recorded in all the management nodes.

Figure 15:
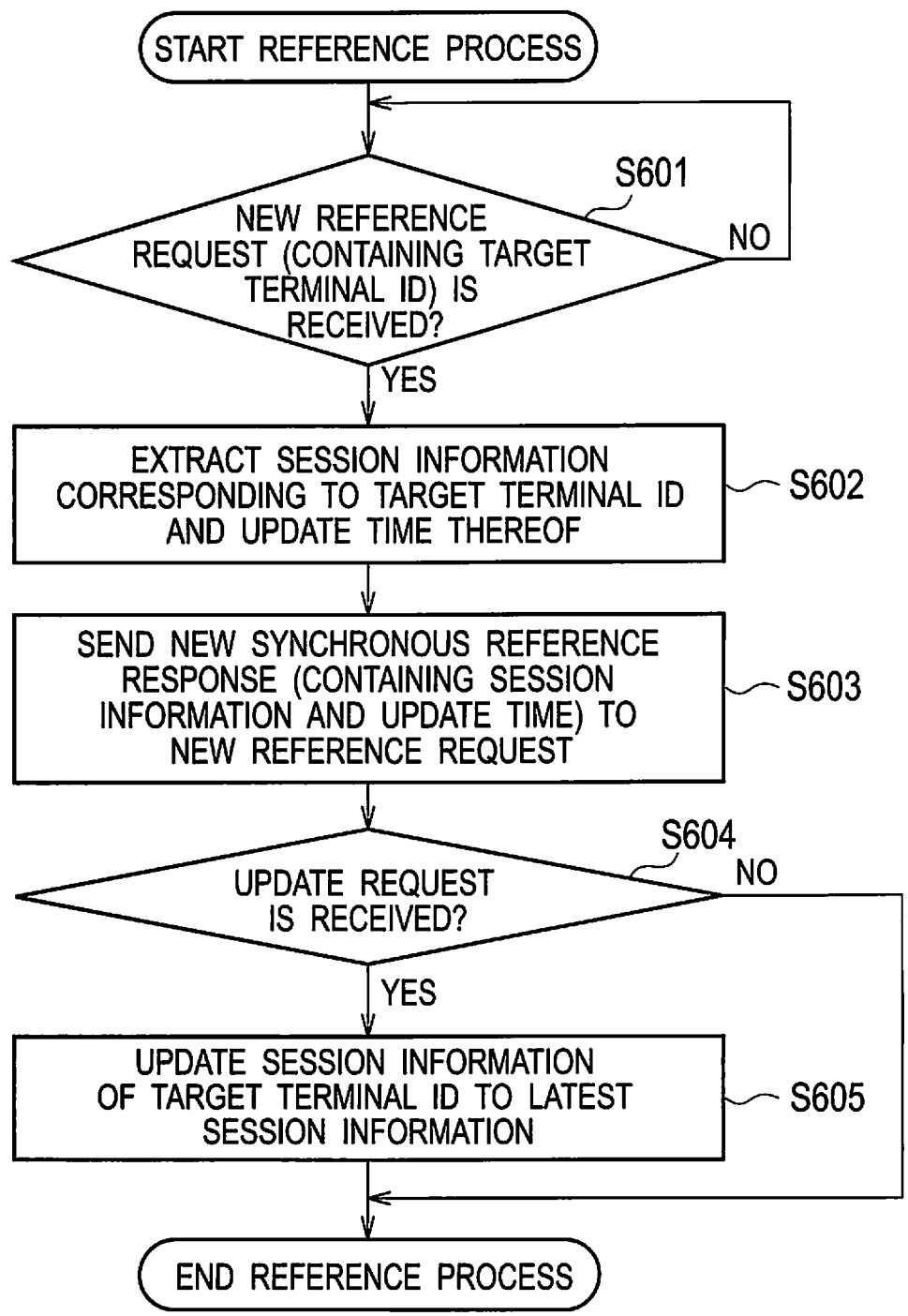
FIG. 15 is a flowchart describing the update process by a reference unit of the access control apparatus according to the embodiment of the present invention.

Next, a reference process by the reference unit 14 of the access control apparatus 1a according to the embodiment of the present invention will be described with reference to FIG. 15. The reference process is executed when a new reference request is received.

First, when the reference unit 14 of the access control apparatus 1a receives a new reference request in step S601, the reference unit 14 proceeds to step S602. This new reference request contains the reference-target terminal identifier. In step S602, the reference unit 14 refers to the session data 21a and acquires the session information of the reference-target terminal identifier and the update time thereof. Further, in reply to the new reference request received in step S601, the reference unit 14 sends a new reference response to the sender of the new reference request in step S603. This new reference response contains the session information and the update time acquired in step S602.

Meanwhile, the reference unit 14 waits to receive an update request subsequently in step S604. For example, if waiting for a predetermined period of time but receiving no update request, the reference unit 14 simply ends the process. This update request contains the identifier of the target terminal and the latest session information thereof.

If an update request is received, the session information of the target terminal recorded in the session data 21a is not the latest information. Thus, the reference unit 14 updates, in step S605, the session information associated with the terminal identifier of the target terminal to the latest session information of the basis of the received update request, and then ends the process.

The processes of the node control unit 15 according to the embodiment of the present invention will be described with reference to FIGS. 16 to 20. The node control unit 15 executes the processes for halt, return, addition, and deletion of a node.

First, a process for halt of the first access control apparatus 1a will be described with reference to FIG. 16. In step S701, the first access control apparatus 1a sends a notification of halt of the first access control apparatus 1a to the second access control apparatus 1b. Likewise, in steps S702 and S703, the first access control apparatus 1a sends the notification of the halt to the third access control apparatus 1c and the fourth access control apparatus 1d.

Upon receipt of the notification of the halt of the node from the first access control apparatus 1a, the second access control apparatus 1b updates its node list data in step S704. The second access control apparatus 1b updates the reference flag and the update flag in its node list data associated with the identifier of the first access control apparatus 1a to "NOT AVAILABLE." This prevents the second access control apparatus 1b from sending reference requests and update requests to the first access control apparatus 1a. Once updating the flags, the second access control apparatus 1b sends, in step S705, a response to the first access control apparatus 1a in reply to step S701. In steps S706 and S707, the third access control apparatus is performs the same processes as those in steps S704 and S705. In steps S708 and S709, the fourth access control apparatus 1d performs the same processes as those in steps S704 and S705.

Once the response is sent from each access control apparatus, the first access control apparatus 1a halts. Here, if receiving no response within a predetermined period of time, the first access control apparatus 1a may notify of the halt of the node again.

Figure 16:
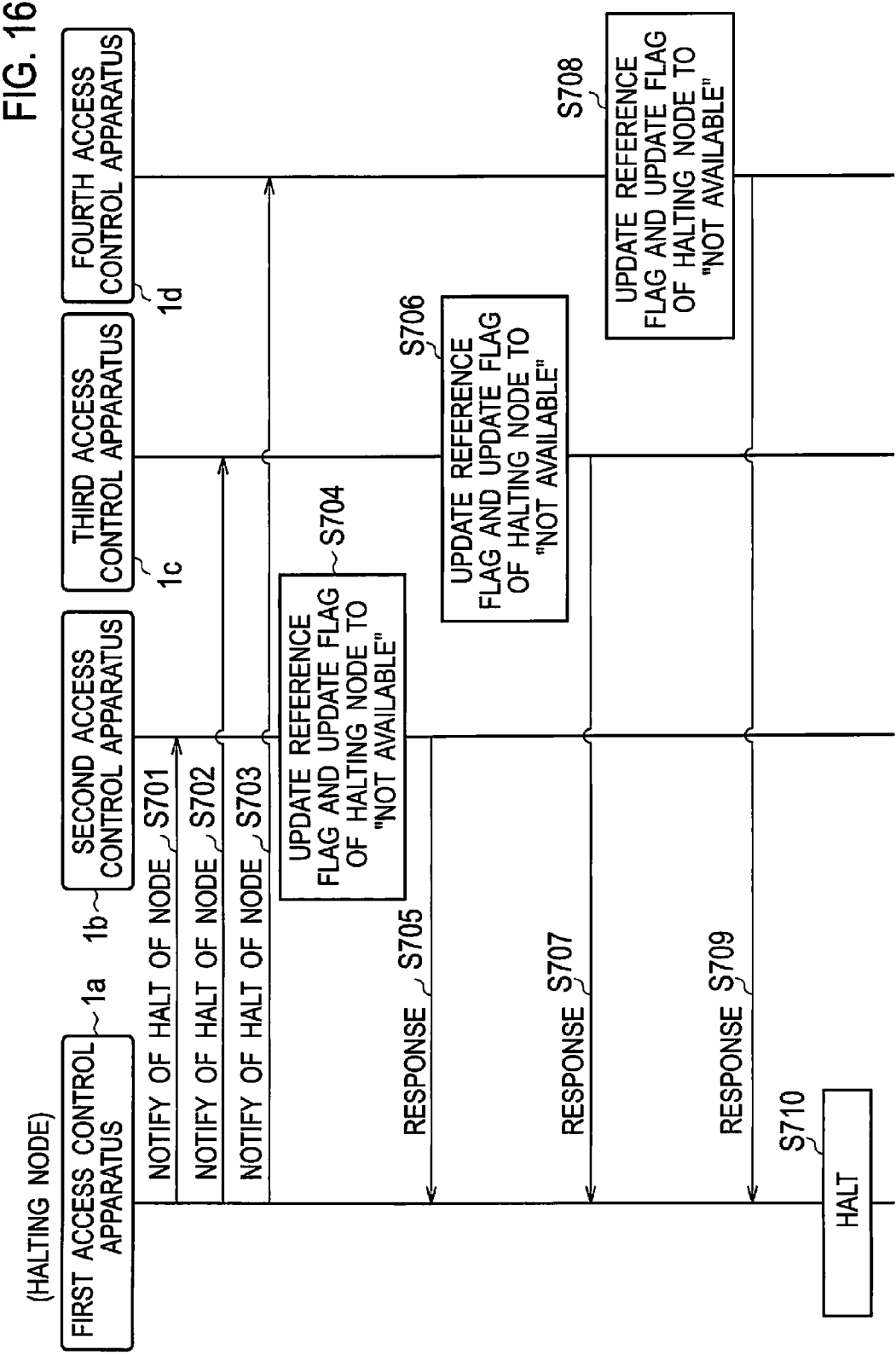
FIG. 16 is a sequence diagram describing operations of the access control system for halt of a node in the communication system according to the embodiment of the present invention.

Although the description is given of a case where the first access control apparatus 1a unicasts the notification in steps S701 to S703 in FIG. 16, the first access control apparatus 1a may broadcast the notification. Moreover, although the description is given of a case where the first access control apparatus 1a being a halting node sends the notification in FIG. 16, a management node (not shown) of the access control system 10 or the like may send the notification.

An outline of a process for return of the first access control apparatus 1a will be described with reference to FIG. 17. In the example shown in FIG. 2, when the first access control apparatus 1a is to return, the first access control apparatus 1a needs to store in advance the session information which the first access control apparatus 1a is arranged to store as a master management node and the session information which the first access control apparatus 1a is arranged to store as slave management nodes. Thus, the first access control apparatus 1a acquires the session information which it is arranged to store as a master management node, from the second access control apparatus 1b which is a slave management node thereof. Moreover, the first access control apparatus 1a acquires the session information which it is arranged to store as slave management nodes, from the fourth access control apparatus 1d and the third access control apparatus 1c. Meanwhile, the first access control apparatus 1a may acquire only the differences from the session data held therein prior to the halt, from the other access control apparatuses.

Figure 17:
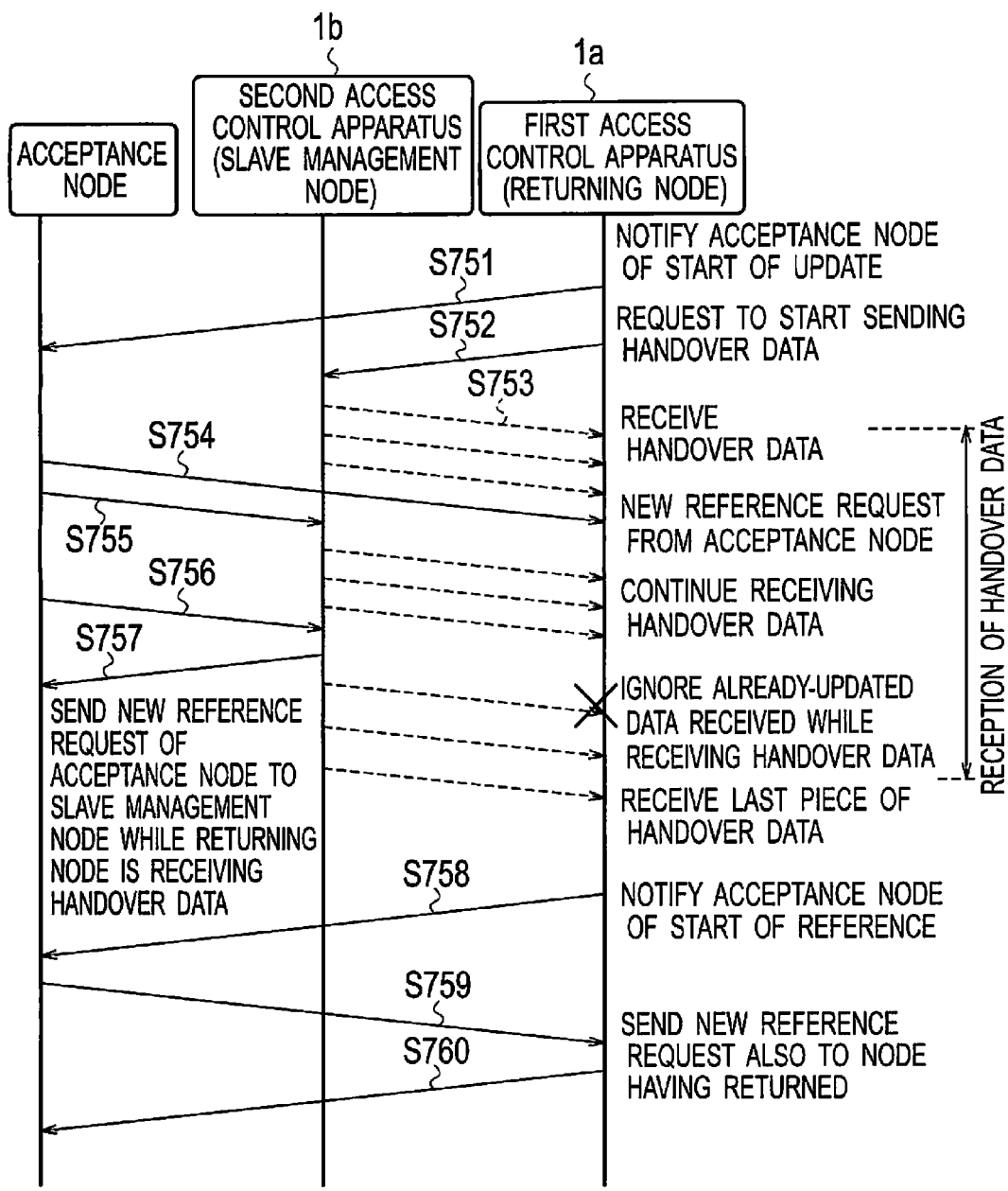
FIG. 17 is a sequence diagram describing operations of the access control system for return of a node to the communication system according to the embodiment of the present invention.

In FIG. 17, described is a case where the first access control apparatus 1a acquires the session information which it is arranged to store as a master management node, from the second access control apparatus 1b which is a slave management node thereof. Moreover, an acceptance node shown in FIG. 17 is an apparatus belonging to the access control system 10 other than the first access control apparatus 1a and is the fourth access control apparatus 1d, for example.

The same communication is performed with the fourth access control apparatus 1d regardless of whether the information is acquired from the second access control apparatus 1b or from the third access control apparatus 1c, and only one of these cases will be described for simplicity.

First, in step S751, the first access control apparatus 1a notifies the fourth access control apparatus 1d being the acceptance node that the first access control apparatus 1a has started update. Here, the acceptance node updates the update flag of the first access control apparatus 1a in its node list data to "AVAILABLE" while leaving the reference flag "NOT AVAILABLE."

Further, in step S752, the first access control apparatus 1a sends the second access control apparatus 1b a request to start sending handover data. This handover data is the data which the first access control apparatus 1a is arranged to manage as a master management node and which the second access control apparatus 1b is arranged to manage as a slave management node thereof. When the redundancy level is 2 or higher, the first access control apparatus 1a may further send the third access control apparatus 1c the request to send the handover data as well.

Upon receipt of the request to start sending the handover data, the second access control apparatus 1b starts sending the handover data to the first access control apparatus 1a in step S753. Once receiving the handover data, the first access control apparatus 1a stores it in the session-data storage part 21.

Now, description will be given of a case where the first access control apparatus 1a receives a new update request from the acceptance node. As has been described with reference to FIG. 9 and some other drawings, the new update request is sent by the access control apparatus having received the corresponding update request, for update of the session information of a user terminal which the first access control apparatus 1a is arranged to hold as a master management node or as a slave management node.

Upon receipt of the new update request in step S754, the first access control apparatus 1a updates its session data 21a and returns that fact to the acceptance node. Meanwhile, when this new update request is a request for the session information which the first access control apparatus 1a is arranged to manage as a master management node, the same new update request is sent in step S755 also to the second access control apparatus 1b, which is a slave management node thereof, to update the session data of the second access control apparatus 1b.

Here, the first access control apparatus 1a may possibly receive already-updated session information while receiving the handover data. For example, there may be a case where the session information of a given user terminal is updated while the first access control apparatus 1a is receiving the handover data. In this case, the first access control apparatus 1a receives a new update request in step S754 and updates the session data 21a of the first access control apparatus 1a. In this step, the second access control apparatus 1b, which is a slave management node, is supposed to receive the new update request and perform update, but may possibly fail to perform the update. In this case, if the session information held in the first access control apparatus 1a is the latest session information, the first access control apparatus 1a discards session information received from the second access control apparatus 1b without updating its session data 21 with it. In this way, it is possible to avoid a situation where the session data 21a of the first access control apparatus 1a having already been updated is overwritten with older session information from the second access control apparatus 1b.

Moreover, it is possible that access occurs for reference to the session information which the first access control apparatus 1a is arranged to hold as a master management node while the first access control apparatus 1a is receiving the handover data. In this case, the acceptance node does not send a new reference request to the first access control apparatus 1a because the reference flag of the first access control apparatus 1a is "NOT AVAILABLE." Here, as has been described with reference to FIG. 11, the new reference request is sent by the access control apparatus which has received the corresponding reference request, for reference to the session information of the user terminal which the first access control apparatus 1a is arranged to hold as a master management node or as a slave management node. Accordingly, the acceptance node sends the new reference request the second access control apparatus 1b, which is a slave management node, in step S756. In step S757, the second access control apparatus 1b sends the acceptance node a new reference response to the new reference request.

When finishing receiving the handover data from the second access control apparatus 1b, the first access control apparatus 1a notifies the fourth access control apparatus 1d being the acceptance node in step S758 that the first access control apparatus 1a has started reference. Here, the acceptance node updates the reference flag of the first access control apparatus 1a in its node list data to "AVAILABLE."

Then, the acceptance node starts the sending of new reference requests to the first access control apparatus 1a. When the acceptance node sends a new reference request to the first access control apparatus 1a in step S759, the first access control apparatus 1a creates a new reference response to the new reference request. In step S760, the first access control apparatus 1a sends the new reference response to the acceptance node.

The processes of steps S751 and S758 shown in FIG. 17 are executed for all the access control apparatuses among the access control apparatuses in the access control system 10 except the first access control apparatus 1a being the returning node. After notifying all the other access control apparatuses of the start of update, the first access control apparatus 1a being the returning node receives the handover data such as the session information to be held therein. Moreover, after finishing receiving the handover data, the first access control apparatus 1a being the returning node notifies all the other access control apparatuses of the start of reference. In this way, the returning node can notify the other nodes of the timing of the start of update and the timing of the start of reference.

As shown in FIG. 17, when the access control apparatus 1 is to return, it first notifies the other nodes that it accepts update. After acquiring all the session information to be recorded in the access control apparatus 1, the access control apparatus 1 notifies the other nodes that it accepts reference. Thus, even if some other access control apparatus fails to perform update during the reception of the handover data, the access control apparatus 1 can correctly update the session information in the access control apparatus 1.

Next, a process of a returning node and a process of a node other than the returning node will be described with reference to FIGS. 18A and 18B.

Figure 18A:
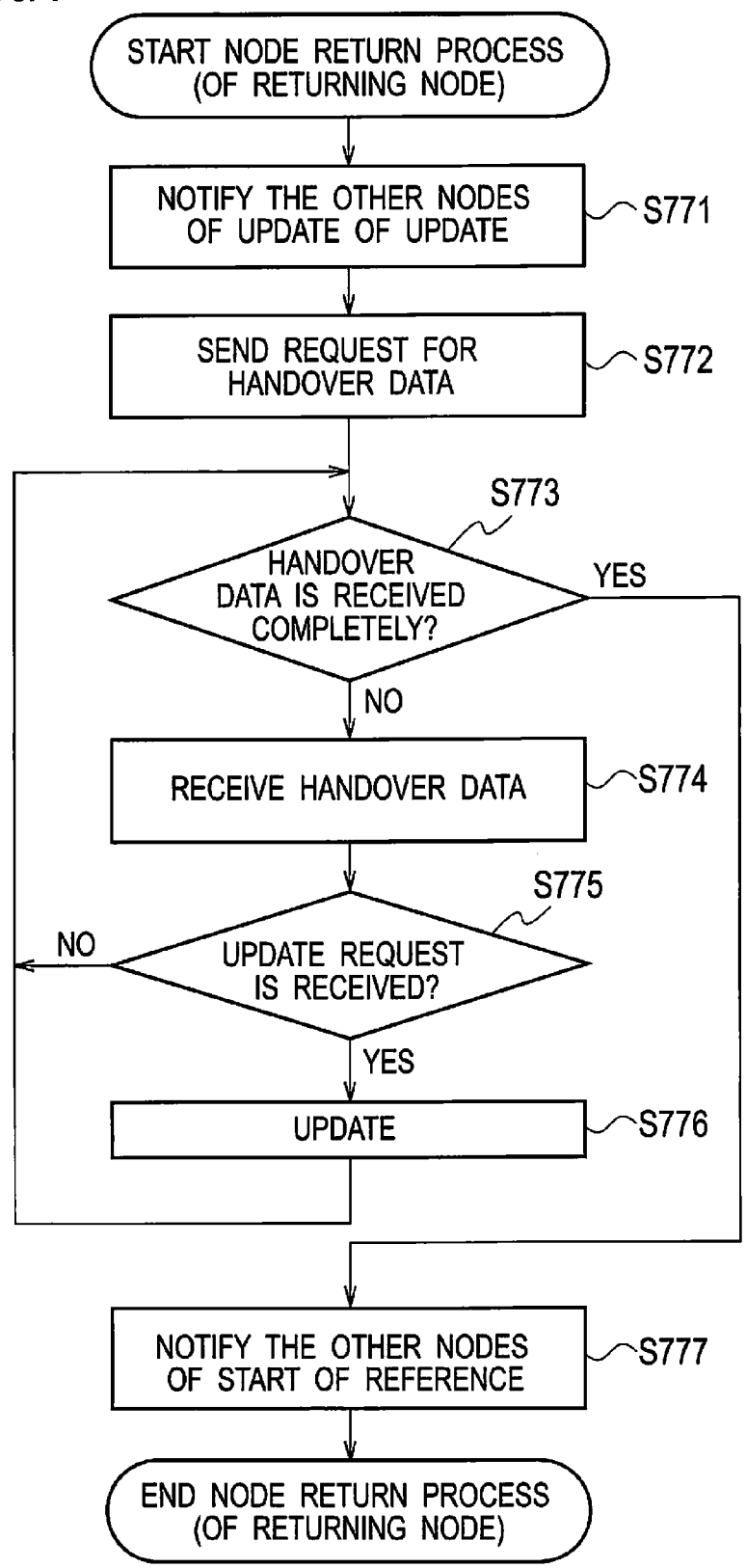
FIG. 18A is a flowchart describing operations of the access control apparatus being the returning node in the return of a node to the communication system according to the embodiment of the present invention.

FIG. 18A describes the process of a returning node. In step S771, the returning node notifies the other nodes of the start of update. In step S772, the returning node sends a request for the handover data. In the example shown in FIG. 17, the first access control apparatus 1a sends the request for the handover data to the second access control apparatus 1b. Then, the returning node starts receiving the handover data.

In step S773, the returning node determines whether or not the handover data has been received completely. If the handover data has not yet been received completely, the returning node continues to receive the handover data in step S774. Here, if receiving a new update request in step S775, the returning node updates the session data 21a in accordance with the new update request in step S776, and then goes back to step S773.

Once the handover data is all received completely in step S773, the returning node proceeds to step S777. In step S777, the returning node notifies the other nodes of the start of reference. Then, the returning node becomes capable of receiving new reference requests.

Figure 18B:
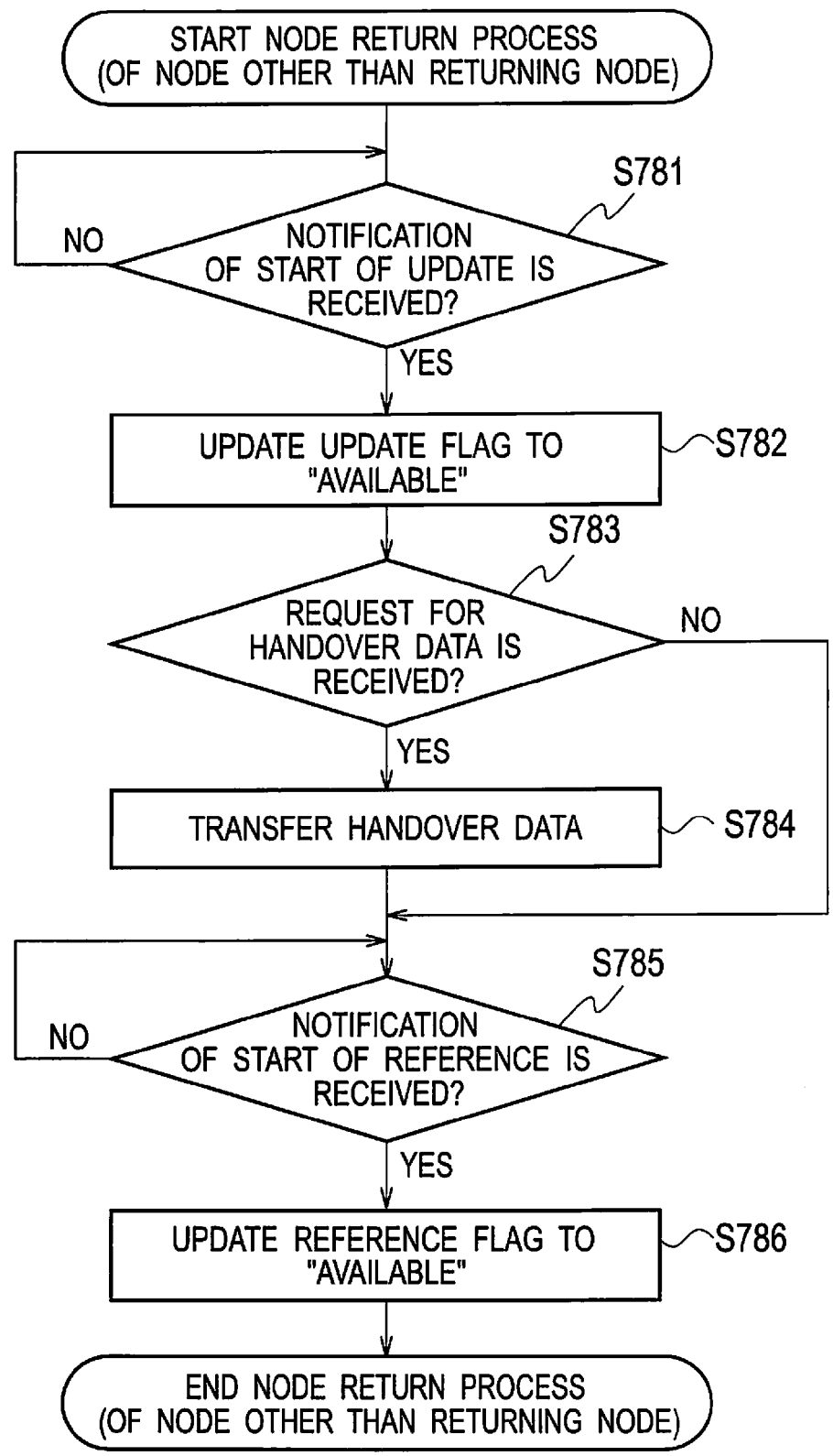
FIG. 18B is a flowchart describing operations of the access control apparatus being a node other than the returning node in the return of a node to the communication system according to the embodiment of the present invention.

FIG. 18B describes the process of a node other than the returning node. In step S781, the node receives the notification of the start of update from the returning node. In step S782, the node updates the update flag associated with the identifier of the returning node in its node list data to "AVAILABLE." The node can now send new update requests to the returning node. Further, in step S783, the node receives the request from the returning node for transfer of the handover data. In step S784, the node transfers the handover data to the returning node.

After the transfer of the handover data is finished and the notification of the start of reference is received from the returning node, the node updates the reference flag associated with the identifier of the returning node to "AVAILABLE" in step S786. The node can now send new reference requests to the returning node.

Figure 19:
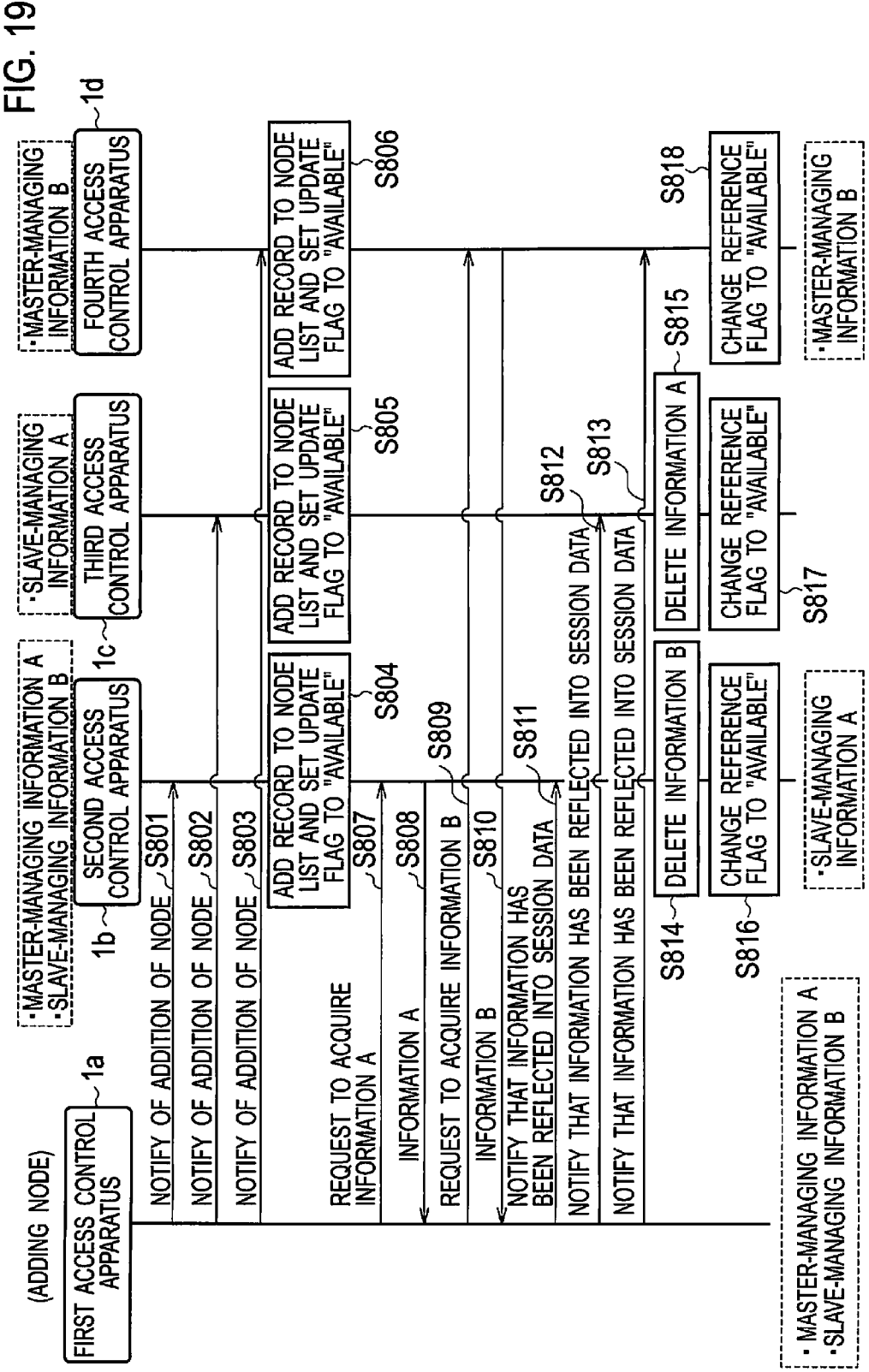
FIG. 19 is a sequence diagram describing operations of the access control system for addition of a node to the communication system according to the embodiment of the present invention.

A process for addition of the first access control apparatus 1a to the access control system 10 will be described with reference to FIG. 19. In the example shown in FIG. 19, information A is information which is master-managed by the second access control apparatus 1b and slave-managed by the third access control apparatus 1c before the first access control apparatus 1a is added, and information which is master-managed by the first access control apparatus 1a and slave-managed by the second access control apparatus 1b after the first access control apparatus 1a is added. Moreover, information B is information which is master-managed by the fourth access control apparatus 1d and slave-managed by the second access control apparatus 1b before the first access control apparatus 1a is added, and information which is master-managed by the fourth access control apparatus 1d and slave-managed by the first access control apparatus 1a after the first access control apparatus 1a is added.

In step S801, the first access control apparatus 1a sends a notification of addition of the first access control apparatus 1a to the second access control apparatus 1b. Likewise, in steps S802 and S803, the first access control apparatus 1a sends the notification of the addition to the third access control apparatus 1c and the fourth access control apparatus 1d.

Upon receipt of the notification of the addition from the first access control apparatus 1a, the second access control apparatus 1b updates its node list data in step S804. The second access control apparatus 1b inserts, into the node list data, a record in which the identifier of the first access control apparatus 1a, a reference flag "NOT AVAILABLE," and an update flag "AVAILABLE" are associated with each other. Once inserting the record, the second access control apparatus 1b sends the first access control apparatus 1a a response to step S801. In steps S805 and S806, the third access control apparatus 1c and the fourth access control apparatus 1d perform the same process as step S804.

Then, the first access control apparatus 1a acquires the data to be recorded in the first access control apparatus 1a, from other access control apparatuses 1. For example, the first access control apparatus 1a sends a request to acquire the information A to the second access control apparatus 1b in step S807 and acquires the information A from the second access control apparatus 1b in step S808. Likewise, the first access control apparatus 1a sends a request to acquire the information B to the fourth access control apparatus 1d in step S809 and acquires the information B from the fourth access control apparatus 1d in step S810. Moreover, the first access control apparatus 1a acquires other necessary information from other access control apparatuses 1.

Once the information to be recorded in the first access control apparatus 1a is all stored in its session-data storage part 21 as described above, the first access control apparatus 1a sends, in step S811, a notification to the second access control apparatus 1b indicating that the information has been reflected into the session data. Likewise, in steps S812 and S813, the first access control apparatus 1a sends the notification to the third access control apparatus 1c and the fourth access control apparatus 1d indicating that the information has been reflected into the session data.

Each access control apparatus 1 having received the notification indicating that the information has been reflected into the session data, identifies information that no longer needs to be recorded therein, and deletes that information. Here, once the first access control apparatus 1a is added, the second access control apparatus 1b no longer needs to slave-manage the information B. Thus, the second access control apparatus 1b deletes the information B from its session-data storage part in step S814 and updates the reference flag associated with the identifier of the first access control apparatus 1a in its node list data to "AVAILABLE" in step S816.

On the other hand, once the first access control apparatus 1a is added, the third access control apparatus 1c no longer needs to slave-manage the information A. Thus, the third access control apparatus 1c deletes the information A from its session-data storage part in step S815 and updates the reference flag associated with the identifier of the first access control apparatus 1a in its node list data to "AVAILABLE" in step S817. Meanwhile, the fourth access control apparatus 1d master-manages the information B also after the first access control apparatus 1a is added, and does therefore not delete that information. Still, the fourth access control apparatus 1d updates the reference flag associated with the identifier of the first access control apparatus 1a in its node list data to "AVAILABLE" in step S818.

Figure 20:
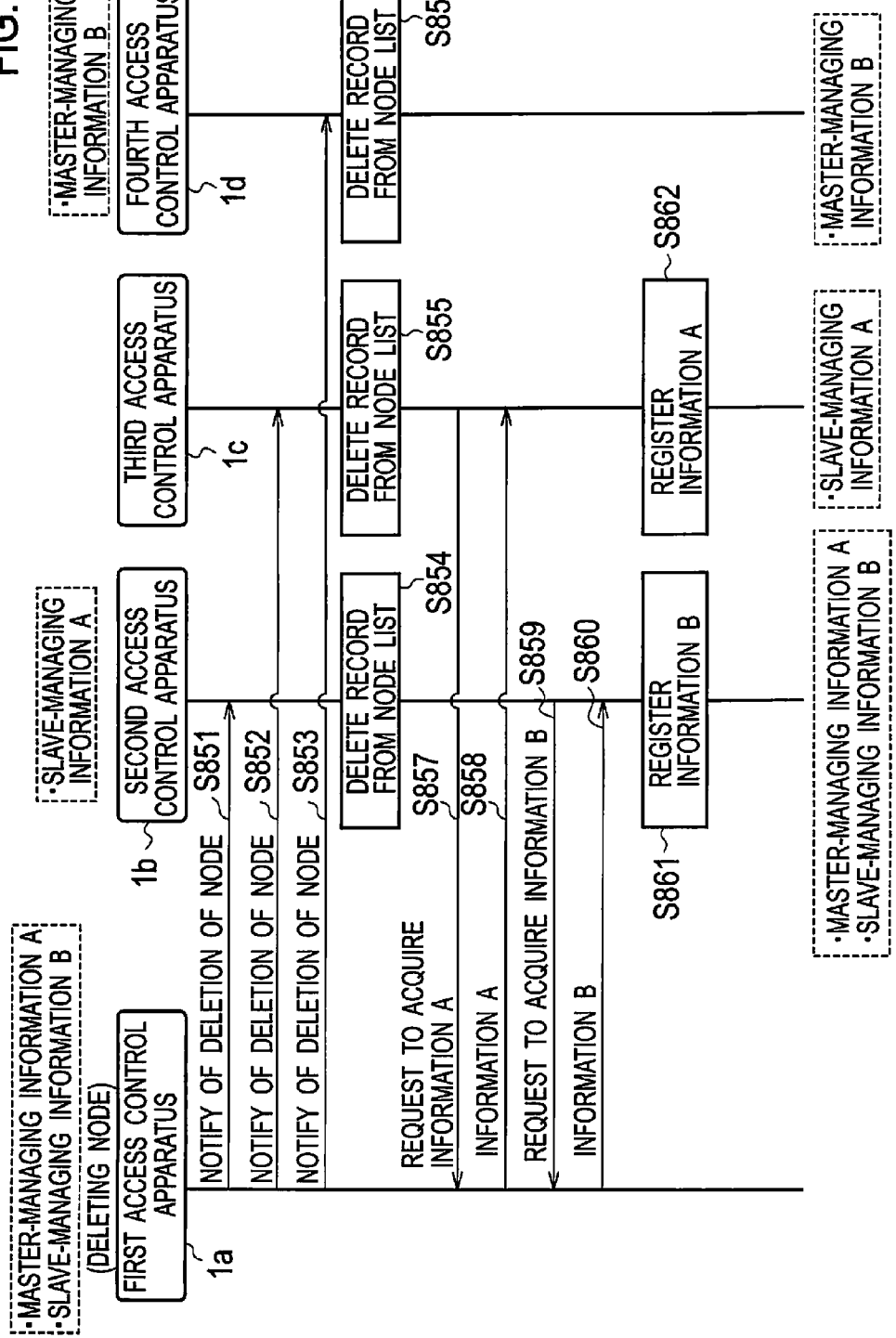
FIG. 20 is a sequence diagram describing operations of the access control system for deletion of a node from the communication system according to the embodiment of the present invention.

First, a process for deletion of the first access control apparatus 1a from the access control system 10 will be described with reference to FIG. 20. In the example shown in FIG. 20, information A is information which is master-managed by the first access control apparatus 1a and slave-managed by the second access control apparatus 1b before the first access control apparatus 1a is deleted, and information which is master-managed by the second access control apparatus 1b and slave-managed by the third access control apparatus 1c after the first access control apparatus 1a is deleted. Moreover, information B is information which is master-managed by the fourth access control apparatus 1d and slave-managed by the first access control apparatus 1a before the first access control apparatus 1a is deleted, and information which is master-managed by the fourth access control apparatus 1d and slave-managed by the second access control apparatus 1b after the first access control apparatus 1a is deleted.

In step S851, the first access control apparatus 1a sends a notification of deletion of the first access control apparatus 1a to the second access control apparatus 1b. Likewise, in steps S852 and S853, the first access control apparatus 1a sends the notification of the deletion to the third access control apparatus 1c and the fourth access control apparatus 1d.

Upon receipt of the notification of the deletion of the node from the first access control apparatus 1a, the second access control apparatus 1b deletes the record associated with the identifier of the first access control apparatus 1a from its node list data in step S854. In steps S855 and S856, the third access control apparatus 1c and the fourth access control apparatus 1d perform the same process as that in step S854.

Then, each access control apparatus 1 determines whether there is any information to be acquired from the first access control apparatus 1a. If there is such information, the access control apparatus 1 acquires it from the first access control apparatus 1a. For example, the third access control apparatus 1c sends a request to acquire the information A to the first access control apparatus 1a in step S857 and acquires the information A from the first access control apparatus 1a in step S858. Likewise, the second access control apparatus 1b sends a request to acquire the information B to the first access control apparatus 1a in step S859 and acquires the information B from the first access control apparatus 1a in step S860. Moreover, each access control apparatus 1 acquires other necessary information from the first access control apparatus 1a as well.

Moreover, the second access control apparatus 1b stores the information B acquired in step S860 in its session-data storage part. The third access control apparatus 1c stores the information A acquired in step S859 in its session-data storage part.

Once the information recorded in the first access control apparatus 1a is all transferred to the other access control apparatuses, the first access control apparatus 1a can be shut down.

As described above, the access control system 10 according to the embodiment of the present invention includes multiple access control apparatuses 1. Upon receipt of a reference or update request, the access control system 10 identifies each access control apparatus storing therein the session information of the reference- or update-target user terminal on the basis of the identifier of the user terminal, and sends a reference or update request to the identified access control apparatus. Thus, the access control system 10 simply performs unicast communication with the identified access control apparatus at the time of reference to or update of the session information. Accordingly, the communication load on the whole system can be reduced.

Moreover, the session information of a given user terminal may be stored in multiple access control apparatuses. Thus, in the event of trouble in some of the access control apparatuses, the information recorded in the other access control apparatuses can be used. Accordingly, the reliability of the session management of the access control system 10 can be improved.

Moreover, because a hash function is used to identify what information is stored in each access control apparatus, it is easy to add or delete access control apparatuses to or from the access control system 10. Thus, it is possible to add access control apparatuses when the traffic of the whole access control system 10 increases, and to delete access control apparatuses when the traffic decreases. Accordingly, the access control system 10 can, as a whole, flexibly handle changes in the traffic.

As described above, according to the access control system according to the embodiment of the present invention, it is possible to reduce the load on the resource and to flexibly handle increase in access.

(Modification)

The embodiment of the present invention has described a case where each access control apparatus of the access control system 10 can accept an update or reference request and identify the management nodes. Now, description will be given of a case where an access control system 10a according to a modification includes an acceptance apparatus 7.

Figure 21:
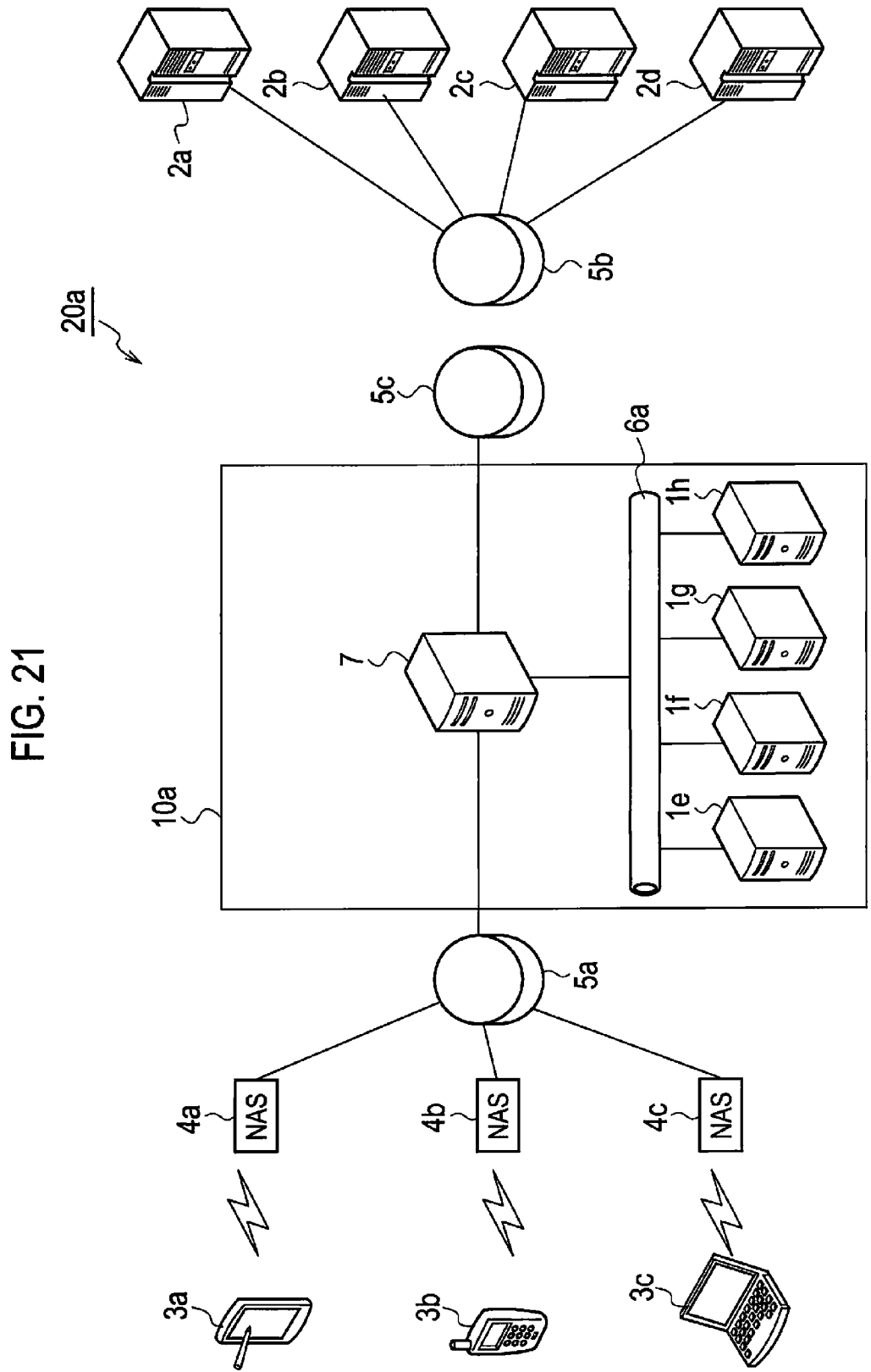
FIG. 21 is a diagram describing the system configuration of a communication system according to a modification of the present invention.

As shown in FIG. 21, the access control system 10a according to the modification has the acceptance apparatus 7 and each access control apparatus 1 connected to one another by an access control network 6a. The acceptance apparatus 7 is connected to the first communication network 5a and the second communication network 5b and is capable of communicating with the NAS 4 and the service processing system 2.

The acceptance apparatus 7 includes the processing units of the access control apparatus 1 related to the acceptance of requests, which are shown in FIG. 5. The acceptance apparatus 7 accepts an update or reference request for the session information of the user terminal 3. Specifically, as shown in FIG. 22, a storage device 707 of the acceptance apparatus 7 includes a node-list-data storage part 723, and an update acceptance unit 71, a reference acceptance unit 72, and a node control unit 73 are implemented in a central process control device 701. The node-list-data storage part 723, the update acceptance unit 71, the reference acceptance unit 72, and the node control unit 73 correspond to the node-list-data storage part 23, the update acceptance unit 11, the reference acceptance unit 13, and the node control unit 15 shown in FIG. 5, respectively.

A fifth access control apparatus 1e according to the modification does not include the acceptance-related processing units of the access control apparatus 1 according to the embodiment, which are shown in FIG. 5. Specifically, as shown in FIG. 23, the fifth access control apparatus 1e differs from the access control apparatus 1 according to the embodiment shown in FIG. 5 in that the fifth access control apparatus 1e does not include the update acceptance unit 11 and the reference acceptance unit 13.

In the access control system 10a, when the acceptance apparatus 7 receives an update request for the session information of the user terminal 3, the acceptance apparatus 7 identifies the multiple access control apparatuses 1 storing therein the session information of the user terminal 3 on the basis of the identifier of the user terminal. Further, the acceptance apparatus 7 sends a new update request for the session information of the user terminal 3 to each of the multiple identified access control apparatuses 1. Each access control apparatus 1 having received the new update request updates its session-data storage part in association with an update time.

In the access control system 10a, when the acceptance apparatus 7 receives a reference request for the session information of the user terminal 3, the acceptance apparatus 7 identifies the multiple access control apparatuses 1 storing therein the session information of the user terminal 3 on the basis of the identifier of the user terminal. Further, the acceptance apparatus 7 sends a new reference request for the session information of the user terminal 3 to each of the multiple identified access control apparatuses 1. Each access control apparatus 1 having received the new reference request acquires the session information of the user terminal 3 and the update time thereof from its session-data storage part and sends them to the acceptance apparatus 7.

The acceptance apparatus 7 compares the pieces of session information of the user terminal and the update times thereof received from the access control apparatuses having received the new reference request to extract the latest session information. The acceptance apparatus 7 sends the latest session information as a reference response to the reference request.

As has been described in the embodiment, the acceptance apparatus 7 may then send the latest session information to any access control apparatus recording therein older session information for update.

According to the access control system 10a according to the modification as above, the system for accepting requests and the system for processing the requests can be separated from each other. Thus, in the case where a load is imposed on the resource greatly by the accepting or processing of requests, each case can be handled individually.

As described above, the access control system according to the modification can also reduce the load on the resource and flexibly handle increase in access.

Other Embodiments

Although the embodiment and the modification of the present invention have been described hereinabove, it should not be understood that the statement and the drawings constituting part of this disclosure limit this invention. Various alternative embodiments, examples, and operation techniques become apparent to those skilled in the art from this disclosure.

For example, each access control apparatus described in the embodiment of the present invention may be configured on one set of hardware as shown in FIG. 4, or configured on multiple sets of hardware in accordance with its function and the number of processes. Moreover, the access control apparatus may be implemented on an existing communication system. Also, although the communication between the access control apparatuses has been described as a method in which information is acquired in a request style, it is possible to employ a push style.

It is apparent that the present invention includes various embodiments and the like that are not described herein. Therefore, the technical scope of the present invention shall be determined solely by the specified matters in the invention according to the claims that are appropriate from the above description.

The invention claimed is:

1. An access control method for a system comprising access control apparatuses connected bidirectionally in a communication network, each of the access control apparatus including session-data storage which stores session information of a user terminal, the access control method comprising the steps:

an access control apparatus receives an update request for session information of a user terminal;

the access control apparatus having received the update request identifies access control apparatuses storing therein the session information of the user terminal on the basis of an identifier of the user terminal;

the access control apparatus having received the update request sends another update request for the session information of the user terminal to each of the identified access control apparatuses;

each of the access control apparatuses having received said another update request updates the session-data storage of the access control apparatus having received said another update request by associating session information of the user terminal and an update time with the identifier of the user terminal;

if successfully updating the session-data storage, each of the access control apparatuses having received said another update request sends another update response indicating the completion of the update in reply to said another update request to the access control apparatus having received the update request;

upon receipt of said another update response from a predetermined number or more of the access control apparatuses having received said another update request, the access control apparatus having received the update request sends an update response indicating the completion of the update in reply to the update request;

when service is to be provided to the user terminal, any one of the access control apparatuses receives a reference request for the session information of the user terminal from a service processing system;

the access control apparatus having received the reference request identifies the access control apparatuses storing therein the session information of the user terminal on the basis of the identifier of the user terminal;

the access control apparatus having received the reference request sends another reference request for the session information of the user terminal to each of the identified access control apparatuses;

each of the access control apparatuses having received said another reference request acquires the session information of the user terminal and the update time thereof from the session-data storage of the access control apparatus having received said another reference request and sends the session information and the update time to the access control apparatus having received the reference request; and the access control apparatus having received the reference request compares the pieces of session information of the user terminal and the update times thereof received from the access control apparatuses having received said another reference request to extract the latest session information, and sends the latest session information to the service processing system as a reference response to the reference request.

2. The access control method according to claim 1, wherein each of the access control apparatuses is capable of referring to node list data in which an identifier of each of the access control apparatuses belonging to the access control system is associated with an update flag indicating whether or not the access control apparatus is updatable and with a reference flag indicating whether or not the access control apparatus is referable, and the access control method further comprises the steps of:
   in a case where an access control apparatus in halt is to return to the access control system, the returning access control apparatus sends a request to change the update flag of the returning access control apparatus to indicate an updatable status, to the access control apparatuses belonging to the access control system;
   the returning access control apparatus receives session information to be recorded in the returning access control apparatus, from the access control apparatuses belonging to the access control system and stores the session information in the session-data storage; and
   once the returning access control apparatus stores the session information to be recorded in the returning access control apparatus, the returning access control apparatus sends a request to change the reference flag of the returning access control apparatus to indicate a referable status, to the access control apparatuses belonging the access control system.

3. The access control method according to claim 2, wherein
when the access control apparatus having received the update request sends said another update request for the session information of the user terminal to the identified access control apparatuses, the access control apparatus refers to the node list data and sends said another update request for the session information of the user terminal to each of the access control apparatus with its update flag indicating the updatable status, among the identified access control apparatuses, and when the access control apparatus having received the reference request sends said another reference request for the session information of the user terminal to the identified access control apparatuses, the access control apparatus refers to the node list data and sends said another reference request for the session information of the user terminal to each of the access control apparatus with its reference flag indicating the referable status, among the identified access control apparatuses.

4. The access control method according to any one of claims 1 to 3, further comprising the step of: the access control apparatus having received the reference request sends an update request to the latest session information of the user terminal to any access control apparatus not storing the latest session information among the identified access control apparatuses.

5. An access control apparatus for a system comprising access control apparatuses which store session information of a user terminal, the access control apparatus comprising:
   a session-data storage that stores session data in which an identifier of a user terminal, session information, and an update time are associated with each other;
   an update acceptance unit that, upon receipt of an update request for the session information of the user terminal, identifies access control apparatuses storing therein the session information of the user terminal on the basis of the identifier of the user terminal, and sends another update request for the session information of the user terminal to each of the identified access control apparatuses;
   an update unit that, upon receipt of said another update request, updates the session-data storage by associating session information of the user terminal and an update time with the identifier of the user terminal and, if successfully updating the session-data storage, sends another update response indicating the completion of the update in reply to said another update request to the access control apparatus having received the update request;
   a reference acceptance unit that, upon receipt of a reference request for the session information of the user terminal from a service processing system when service is to be provided to the user terminal, identifies the access control apparatuses storing therein the session information of the user terminal on the basis of the identifier of the user terminal, sends another reference request for the session information of the user terminal to each of the identified access control apparatuses, compares the pieces of session information of the user terminal and the update times thereof received from the access control apparatuses having received said another reference request to extract the latest session information, and sends the latest session information to the service processing system as a reference response to the reference request; and
   a reference unit that, upon receipt of another reference request, acquires the session information of the user terminal and the update time thereof from the session-data storage and sends the session information and the update time, wherein upon receipt of another update response from a predetermined number or more of the access control apparatuses having received said another update request, the update acceptance unit further sends an update response indicating the completion of the update in reply to the update request.

6. The access control apparatus according to claim 5, further comprising:
   a node-list-data storage that stores node list data in which an identifier of each of the access control apparatuses belonging to the access control system is associated with an update flag indicating whether or not the access control apparatus is updatable and with a reference flag indicating whether or not the access control apparatus is referable; and a node control unit that, in a case where the access control apparatus is to be added to the access control system,
sends a request to change the update flag of the access control apparatus to indicate an updatable status, to the access control apparatuses belonging to the access control system,
receives session information to be recorded in the access control apparatus, from the access control apparatuses belonging to the access control system, and stores the session information in the session-data storage, and
once storing the session information to be recorded in the access control apparatus, sends a request to change the reference flag of the access control apparatus to indicate a referable status, to the access control apparatuses belonging to the access control system.

7. The access control apparatus according to claim 6, wherein
upon receipt of the update request, the update acceptance unit refers to the node list data and sends said another update request for the session information of the user terminal to each of the access control apparatus with its update flag indicating the updatable status, among the identified access control apparatuses, and
upon receipt of the reference request, the reference acceptance unit refers to the node list data and sends said another reference request for the session information of the user terminal to each of the access control apparatus with its reference flag indicating the referable status, among the identified access control apparatuses.

8. The access control apparatus according to any one of claims 5 to 7, wherein the reference acceptance unit further sends an update request to the latest session information of the user terminal to any access control apparatus not storing the latest session information among the identified access control apparatuses.

9. An access control program being on a non-transitory computer-readable storage medium for a system comprising access control apparatuses which store session information of a user terminal, wherein
the access control program causes a computer to function as:
an update acceptance unit that, upon receipt of an update request for the session information of the user terminal, identifies access control apparatuses storing therein the session information of the user terminal on the basis of an identifier of the user terminal, and sends another update request for the session information of the user terminal to each of the identified access control apparatuses;
an update unit that, upon receipt of said another update request, updates a session-data storage that stores session data in which the identifier of the user terminal, the session information, and an update time thereof are associated with each other, by associating session information of the user terminal and an update time with the identifier of the user terminal, and, if successfully updating the session-data storage, sends another update response indicating the completion of the update in reply to said another update request to the access control apparatus having received the update request;
a reference acceptance unit that, upon receipt of a reference request for the session information of the user terminal from a service processing system when service is to be provided to the user terminal, identifies the access control apparatuses storing therein the session information of the user terminal on the basis of the identifier of the user terminal, sends another reference request for the session information of the user terminal to each of the identified access control apparatuses, compares the pieces of session information of the user terminal and the update times thereof received from the access control apparatuses having received said another reference request to extract the latest session information, and sends the latest session information to the service processing system as a reference response to the reference request; and
a reference unit that, upon receipt of another reference request, acquires the session information of the user terminal and the update time thereof from the session-data storage and sends the session information and the update time, wherein
upon receipt of said another update response from a predetermined number or more of the access control apparatuses having received said another update request, the update acceptance unit further sends an update response indicating the completion of the update in reply to the update request.

10. An access control method for a system comprising an acceptance apparatus and access control apparatuses connected bidirectionally in a communication network, the acceptance apparatus being configured to accept an update or reference request for session information of a user terminal, each of the access control apparatus including session-data storage which stores the session information of a user terminal, the access control method comprising the steps:
the acceptance apparatus receives an update request for session information of a user terminal;
the acceptance apparatus identifies access control apparatuses storing therein the session information of the user terminal on the basis of an identifier of the user terminal;
the acceptance apparatus sends another update request for the session information of the user terminal to each of the identified access control apparatuses;
each of the access control apparatuses having received said another update request updates the session-data storage of the access control apparatus having received said another update request by associating session information of the user terminal and an update time with the identifier of the user terminal;
if successfully updating the session-data storage, each of the access control apparatuses having received said another update request sends another update response indicating the completion of the update in reply to said another update request to the acceptance apparatus;
upon receipt of said another update response from a predetermined number or more of the access control apparatuses having received said another update request, the acceptance apparatus sends an update response indicating the completion of the update in reply to the update request;
when service is to be provided to the user terminal, the acceptance apparatus receives a reference request for the session information of the user terminal from a service processing system;
the acceptance apparatus identifies the access control apparatuses storing therein the session information of the user terminal on the basis of the identifier of the user terminal;
the acceptance apparatus sends another reference request for the session information of the user terminal to each of the identified access control apparatuses;

each of the access control apparatuses having received said another reference request acquires the session information of the user terminal and the update time thereof from the session-data storage of the access control apparatus having received said another reference request and sends the session information and the update time to the acceptance apparatus; and the acceptance apparatus compares the pieces of session information of the user terminal and the update times thereof received from the access control apparatuses having received said another reference request to extract the latest session information, and sends the latest session information to the service processing system as a reference response to the reference request.

* * * * *